United States Patent
Li et al.

(10) Patent No.: US 10,547,241 B1
(45) Date of Patent: Jan. 28, 2020

(54) HYBRID INVERTING PWM POWER CONVERTERS

(71) Applicant: LINEAR TECHNOLOGY HOLDING LLC, Norwood, MA (US)

(72) Inventors: Jian Li, San Jose, CA (US); Jindong Zhang, Fremont, CA (US)

(73) Assignee: Linear Technology Holding LLC, Norwood, MA (US)

( * ) Notice: Subject to any disclaimer, the term of this patent is extended or adjusted under 35 U.S.C. 154(b) by 0 days.

(21) Appl. No.: 16/116,797

(22) Filed: Aug. 29, 2018

(51) Int. Cl.
*H02M 3/158* (2006.01)
*H02M 3/18* (2006.01)

(52) U.S. Cl.
CPC ......... *H02M 3/1588* (2013.01); *H02M 3/158* (2013.01); *H02M 3/18* (2013.01)

(58) Field of Classification Search
CPC ..... H02M 3/1584; H02M 3/1588; H02M 3/18
See application file for complete search history.

(56) References Cited

U.S. PATENT DOCUMENTS

| | | | |
|---|---|---|---|
| 4,654,769 A | 3/1987 | Middlebrook | |
| 6,617,832 B1 | 9/2003 | Kobayashi | |
| 6,812,676 B2 | 11/2004 | Tateishi | |
| 7,116,085 B2 | 10/2006 | Ikezawa | |
| 7,696,735 B2 * | 4/2010 | Oraw | H02M 3/07 323/282 |
| 8,427,113 B2 * | 4/2013 | Xing | H02J 7/0065 320/140 |
| 8,569,963 B2 | 10/2013 | Walters | |
| 8,884,593 B2 | 11/2014 | Su | |
| 9,178,422 B2 | 11/2015 | Dash et al. | |
| 9,548,648 B2 * | 1/2017 | Amaro | H02M 1/08 |
| 9,991,794 B2 | 6/2018 | Lueders et al. | |
| 2006/0214648 A1 | 9/2006 | Liu et al. | |
| 2007/0007568 A1 | 1/2007 | Tanaka et al. | |
| 2008/0266919 A1 | 10/2008 | Mallwitz | |

(Continued)

OTHER PUBLICATIONS

Zhu, Miao & Lin Luo, Fang. (2010). Enhanced Self-Lift Cû Converter for Negative-to-Positive Voltage Conversion. IEEE Transactions on Power Electronics. vol. 25. 2227-2233. Sep. 2010.

(Continued)

*Primary Examiner* — Kyle J Moody
(74) *Attorney, Agent, or Firm* — Schwegman Lundberg & Woessner, P.A.

(57) ABSTRACT

A hybrid power converter includes a primary switching circuit, an LC circuit, and a secondary switching circuit. The primary switching circuit includes three or more switching transistors in series that may turn on or off according to a switching cycle to generate a series of voltage pulses at a connecting node between two switching transistors. The LC circuit may be coupled via the to the secondary switching circuits to the connecting node of the primary switching circuit. The LC circuit may receive, from the primary switching circuit, a series of pulses via the secondary switching circuits and may generate an inductor current in the LC circuit. The inductor current may charge a capacitor of the LC circuit to generate an output voltage of the hybrid power converter. The output voltage may have a reverse polarity with respect to an input voltage that may be coupled to the primary switching circuit.

18 Claims, 12 Drawing Sheets

(56) References Cited

U.S. PATENT DOCUMENTS

| | | |
|---|---|---|
| 2009/0196072 A1 | 8/2009 | Ye |
| 2010/0039080 A1 | 2/2010 | Schoenbauer et al. |
| 2014/0167715 A1 | 6/2014 | Wu et al. |
| 2015/0207401 A1* | 7/2015 | Zhang .................. H02M 3/158 323/271 |
| 2016/0036329 A1 | 2/2016 | David |
| 2016/0072387 A1 | 3/2016 | Schmalnauer et al. |
| 2016/0118894 A1 | 4/2016 | Zhang et al. |
| 2017/0353116 A1* | 12/2017 | Zhang .................... H02M 1/08 |
| 2018/0019666 A1* | 1/2018 | Zhang .................. H02M 3/073 |
| 2018/0026518 A1* | 1/2018 | Liu ...................... H02M 1/088 323/312 |

OTHER PUBLICATIONS

Linear Technology, Negative Input Synchronous Multi-Toplogy DC/DC Controller, 2015, web link http://www.farnell.com/datasheets/1884841.pdf.

Shintron, Step Down/Step Up/Inverting DC-DC Converter, Apr. 2011, Rev. 1.2, HTC, web link http://www.shintron.com.tw/proimages/b8-1/MC34063C.pdf.

STMicroelectronics, Inverting and step-up DC-DC converter, Mar. 2010, Doc ID 13860, Rev. 2, web link https://www.st.com/resource/en/datasheet/cd00169645.pdf.

Richtek, High Efficiency Inverting PWM Converter with Surge Stopper, 2014, web link https://www.richtek.com/Home/Products/Supervisor/Monitoring%20And%20Protection/RT2910A?ForceDevice=1&devicename=richtekweb.

Plasoianu, Gheorghe, SEPIC/Cuk Converter Sprouts Second Output, EDN Netowrk, May 2017, web link https://www.edn.com/design/power-management/4458349/SEPIC-uk-converter-sprouts-second-output.

Kumar et al., Converter Topologies for Hybrid Power Generation Systems, Archived web link https://web.archive.org/web/20161112133900/http://www.electricalindia.in/blog/post/id/5772/converter-topologies-for-hybrid-power-generation-systems.

Texas Instruments, Adjustable Inverting DC/DC Converter, Dec. 1996, web link http://www.ti.com/lit/ds/symlink/tps6755.pdf.

Synqor, NiQor High Voltage DC-DC Converters, web link http://www.synqor.com/hvnq/niqor-connection.html.

Intersil, Boost Converter Generates +5V at 375mA from Wide Range Negative Input Supply, May 2006, web link https://www.intersil.com/content/dam/Intersil/documents/an12/an1256.pdf.

David Zhang et al., Converting Negative Input Voltages to Positive Output Voltages, Sep. 2009, Archived web link https://web.archive.org/web/20140415111149/https://www.powerelectronics.com/power-management/converting-negative-input-voltages-positive-output-voltages.

* cited by examiner

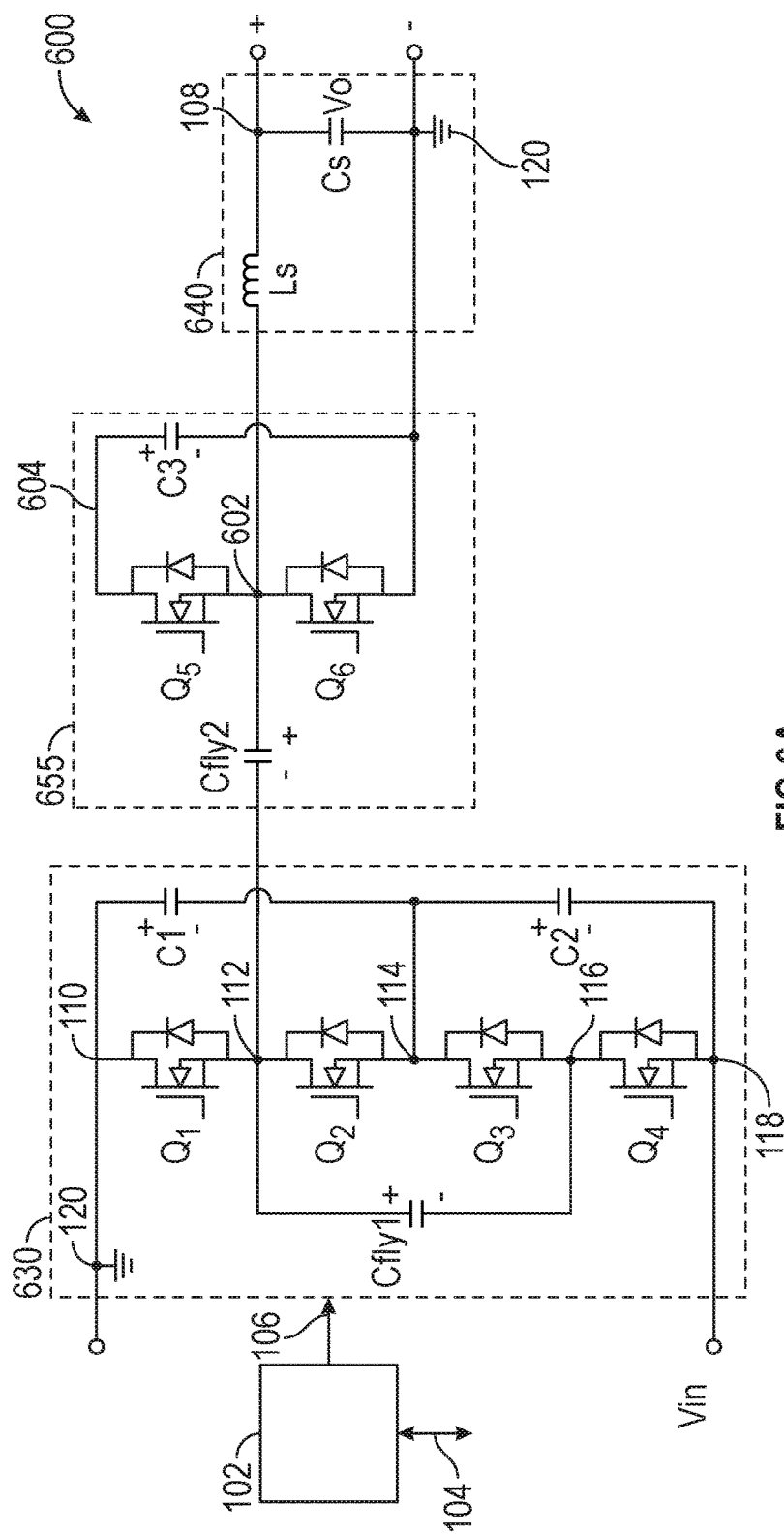
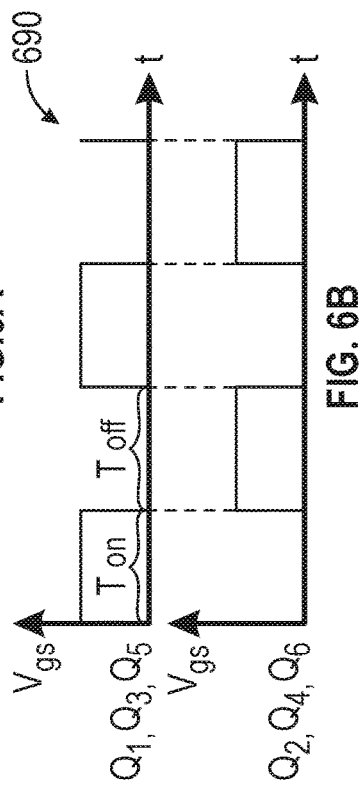
FIG. 6A
FIG. 6B

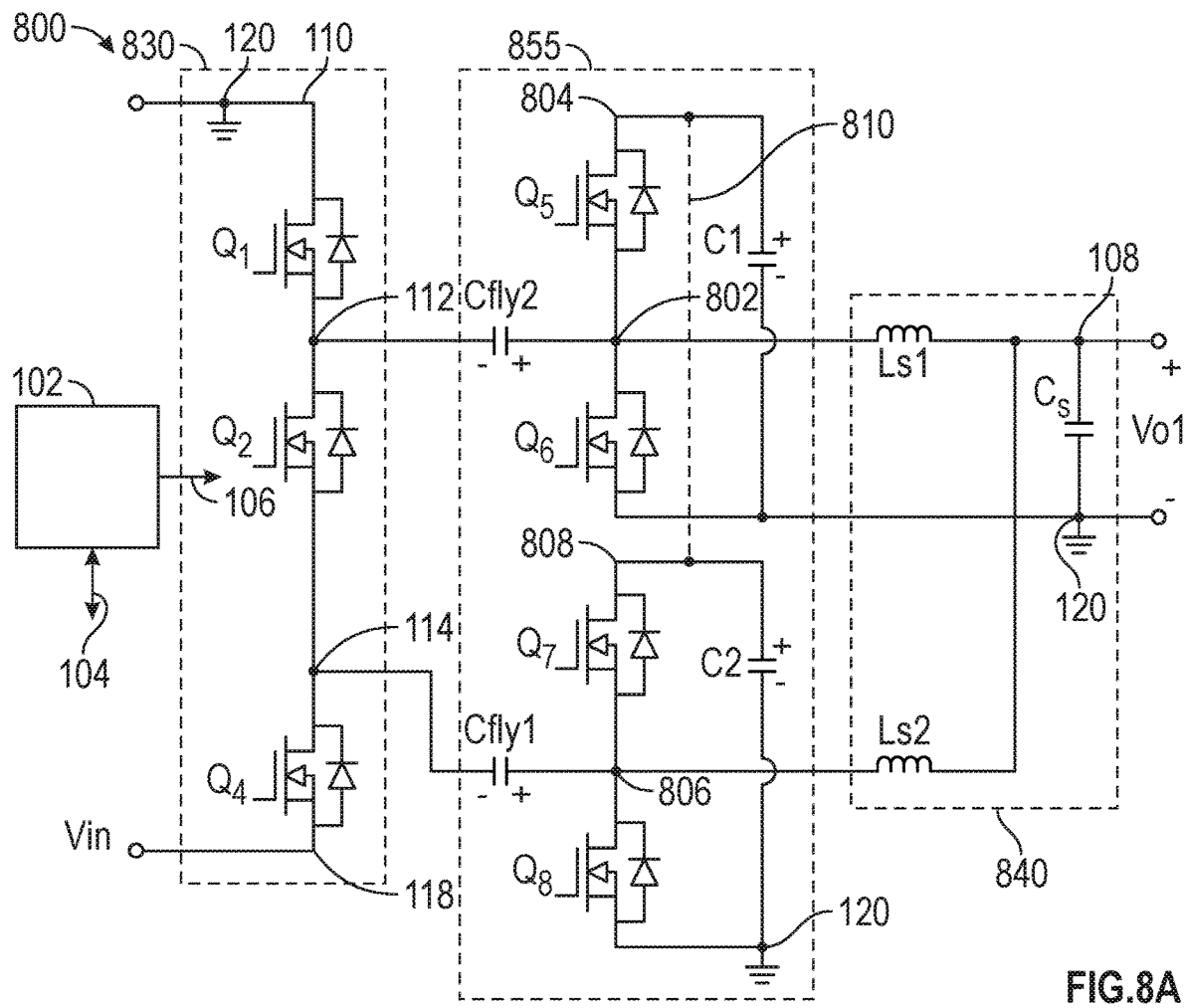
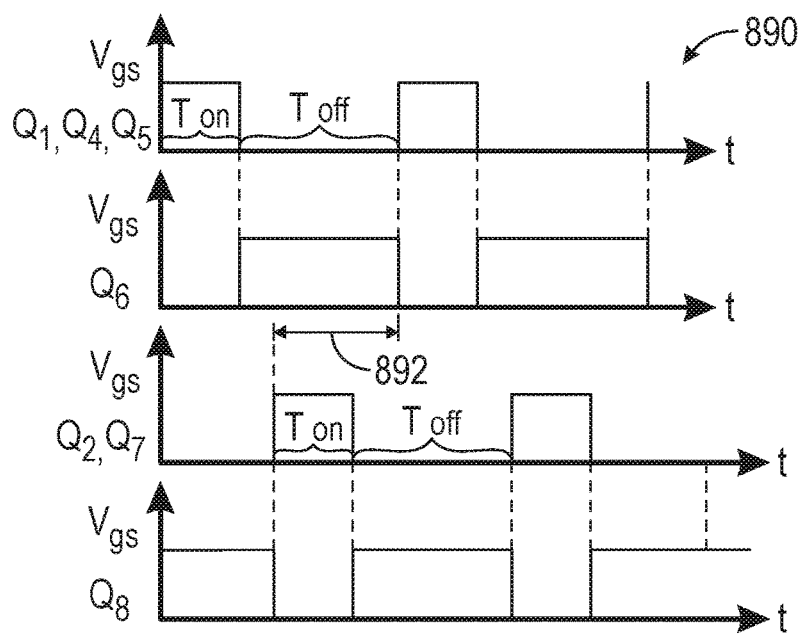
FIG. 8A
FIG. 8B

HYBRID INVERTING PWM POWER CONVERTERS

FIELD OF THE DISCLOSURE

The disclosure relates generally to power converter circuits and, more particularly, to the power converter circuits providing reverse polarity between input and output voltages.

BACKGROUND

Hybrid power converter circuits provide efficient power solutions for power supply design. A hybrid power converter circuit is a type of power converter that provides direct current to direct current (DC-DC) conversion based on switched capacitor converters and inductor-based converters. A hybrid power converter contains one or more switching elements (e.g., one or more transistors) and reactive elements (e.g., capacitors and inductors) that, in connection with a periodic switching of the switching elements provides DC output voltage.

A shortcoming of existing power converters that provide reverse polarity between input and output voltages is that they may provide high voltage and/or current on the switches of the power converters and the power density may be limited by the sizes of magnetic components, including transformer and inductor sizes, that are used for providing the reverse polarity.

Accordingly, what is needed is a design for a higher efficiency converter, without adding considerable cost and complexity, which can provide reverse polarity between input and output voltages with lower voltage and/or current of the switches and at a higher switching frequency to increase power density.

SUMMARY OF THE DISCLOSURE

A hybrid power converter includes a primary switching circuit, an LC circuit, and one or more secondary switching circuits. The primary switching circuit includes three or more switching transistors in series that may turn on or off according to a switching cycle to generate a series of voltage pulses at a one or more connecting node between two switching transistors of the three or more switching transistors. The LC circuit that includes a capacitor and an inductor is series may be coupled via the one or more secondary switching circuits to one or more connecting nodes of the primary switching circuit. The LC circuit may receive, from the primary switching circuit, one or more series of pulses via the one or more secondary switching circuits and may generate an inductor current in the LC circuit. The inductor current may charge the capacitor of the LC circuit to generate an output voltage of the hybrid power converter. The output voltage may have a reverse polarity with respect to an input voltage that may be coupled to the primary switching circuit.

A hybrid power converter according to various implementations includes a primary switching circuit that includes three or more switching transistors that are connected in series and have a first end and a second end. Each one of the three or more switching transistors are linked to an adjacent transistor of the three or more switching transistors by a respective node of a first plurality of nodes. The first plurality of nodes include a first node, a second node, and a third node. The primary switching circuit also includes one or more capacitors that include a first capacitor. The first capacitor may be coupled to the second node. The first capacitor may be coupled across two of the three or more switching transistors that are connected in series. The primary switching circuit further includes a first flying capacitor that may be coupled to at least one of the first node and the third node of the first plurality of nodes. The hybrid power converter also include an LC circuit that comprises a third capacitor and an inductor connected in series. The LC circuit may be coupled to the primary switching circuit via a first secondary switching circuit. The LC circuit may receive a first voltage of the primary switching circuit via the first secondary switching circuit and may generate an output voltage across the third capacitor. The output voltage may have a reverse polarity with respect to an input voltage that may be coupled to the primary switching circuit.

A hybrid power converter according to various implementations comprises a primary switching circuit that includes three or more switching transistors connected in series. The hybrid power converter also includes at least one secondary switching circuit that is coupled between the primary switching circuit and an LC circuit. The hybrid power converter further includes the LC circuit that comprises a capacitor and an inductor connected in series. The LC circuit may be coupled across a switching transistor of the at least one secondary switching circuit. The LC circuit may receive a first voltage from the at least one secondary switching circuit and may generate, based on the first voltage, an essentially constant output voltage across the capacitor. The output voltage may have a reverse polarity with respect to an input voltage that may be coupled to the primary switching circuit. The at least one secondary switching circuit may be coupled to a node linking two adjacent switching transistors of the three or more switching transistors of the primary switching circuit. The at least one secondary switching circuit may receive a series of pulses from the primary switching circuit and may generate the first voltage for the LC circuit.

A method of operating a hybrid power converter according to various implementations comprises pre-charging one or more first capacitors of a primary switching circuit and one or more second capacitors of one or more secondary switching circuits to predefined respective voltages. After pre-charging, the method includes applying switching signals according to a switching cycle to three or more switching transistors of the primary switching circuit and to one or more switching transistors of the one or more secondary switching circuits. Applying switching signals may turn the three or more switching transistors of the primary switching circuit and the one or more switching transistors of the one or more secondary switching circuits on or off. The switching cycle may comprise two or more duty cycles for the switching signals. The method also includes providing a series of pulses by the primary switching circuit and through the one or more secondary switching circuits to an LC circuit. The LC circuit may comprise a capacitor and an inductor connected in series. The method includes adjusting the series of pulses by the one or more secondary switching circuits and providing a voltage across the capacitor of the LC circuit as an output voltage of the hybrid power converter. The output voltage may have a reverse polarity with respect to an input voltage that is coupled to the primary switching circuit. The method further includes adjusting at least one duty cycle of the two or more duty cycles of the switching signals to set the output voltage at a predefined and essentially constant value.

A hybrid power converter according to various implementations comprises means for applying switching signals to primary and secondary switching circuits and means for applying an input voltage to the primary switching circuit. The hybrid power converter includes means for providing a series of pulses to an LC circuit from the primary switching circuit and means for adjusting the series of pulses via the secondary switching circuit. The hybrid power converter also includes means for turning on or off switching transistors of the primary and secondary witching circuits with the switching signals and means for controlling a frequency and duty cycle of the series of pulses. The hybrid power converter further includes means for providing an essentially constant output voltage by the LC circuit. The output voltage may have a reverse polarity with respect to the input voltage.

Other aspects disclosed herein include corresponding methods, systems, apparatuses, and electronic device products for implementation of the hybrid power converter. It is understood that other configurations will become readily apparent to those skilled in the art from the following detailed description, wherein various exemplary configurations and implementations are shown and described by way of illustration.

BRIEF DESCRIPTION OF THE DRAWINGS

The accompanying drawings are presented to aid in the description of example aspects and are provided solely for illustration of embodiments and not limitation thereof.

FIGS. 6A and 6B are diagrams of an exemplary hybrid inverting PWM buck converter and a switching signal of the hybrid inverting PWM buck converter.

FIGS. 8A and 8B are diagrams of an exemplary hybrid inverting PWM buck converter and a switching signal of the hybrid inverting PWM buck converter.

DETAILED DESCRIPTION

Aspects and features, and exemplary implementations practices and applications are disclosed in the following description and related drawings. Alternatives to disclosed examples may be devised without departing from the scope of disclosed concepts.

The term "converter," as used herein, encompasses but is not limited to any one of, or any combination of "regulator," "DC regulator," "voltage regulator," "DC voltage regulator," "DC-DC converter," "DC converter" and "converter," and includes, but is not limited to, the plain meaning of any one or more of these terms.

The subject disclosure provides a hybrid power converter that includes a primary switching circuit, an LC circuit, and one or more secondary switching circuits. The primary switching circuit includes three or more switching transistors in series. The three or more switching transistors of the primary switching circuit that are in series have a first end a second end. Each one of the three or more switching transistors may be connected to an adjacent switching transistor of the three or more switching transistors by a respective connecting node of a plurality of connecting nodes. An input voltage, e.g., a DC voltage, may be coupled between the first end and the second end where the second end may be grounded. A control circuit may be couple to the switching transistors to generate switching signals that may be provided to the switching transistors to turn on or off the switching transistors according to a switching cycle. The turning on or off the switching transistors may generate a series of voltage pulses between each one of the connecting nodes and the ground. In some embodiments, the switching transistors of the primary switching circuit turn on or off according to a switching cycle that comprises two or more switching signals where each one of the switching signals may have a different duty cycle such that two duty cycles can be inverse of each other and the switching signals may switched on or off the switching transistors of the primary switching circuit in phase opposition, e.g., complementary.

The secondary switching circuit may include two switching transistors that may switch in synchronization with switching transistors of the primary switching circuit with the two duty cycles. The LC circuit may be coupled to one or more connecting nodes of the primary switching circuit via the one or more secondary switching circuits. The one or more connecting nodes of the primary switching circuit may provide one or more series of pulses to the LC circuit to generate an inductor current in the LC circuit. The inductor current may vary and may increase and decrease. The inductor current may charge a capacitor of the LC circuit to generate an output voltage of the hybrid power converter. The output voltage of the hybrid power converter may have a reverse polarity with respect to the input voltage that is couples to the primary switching circuit.

Figure 1A:
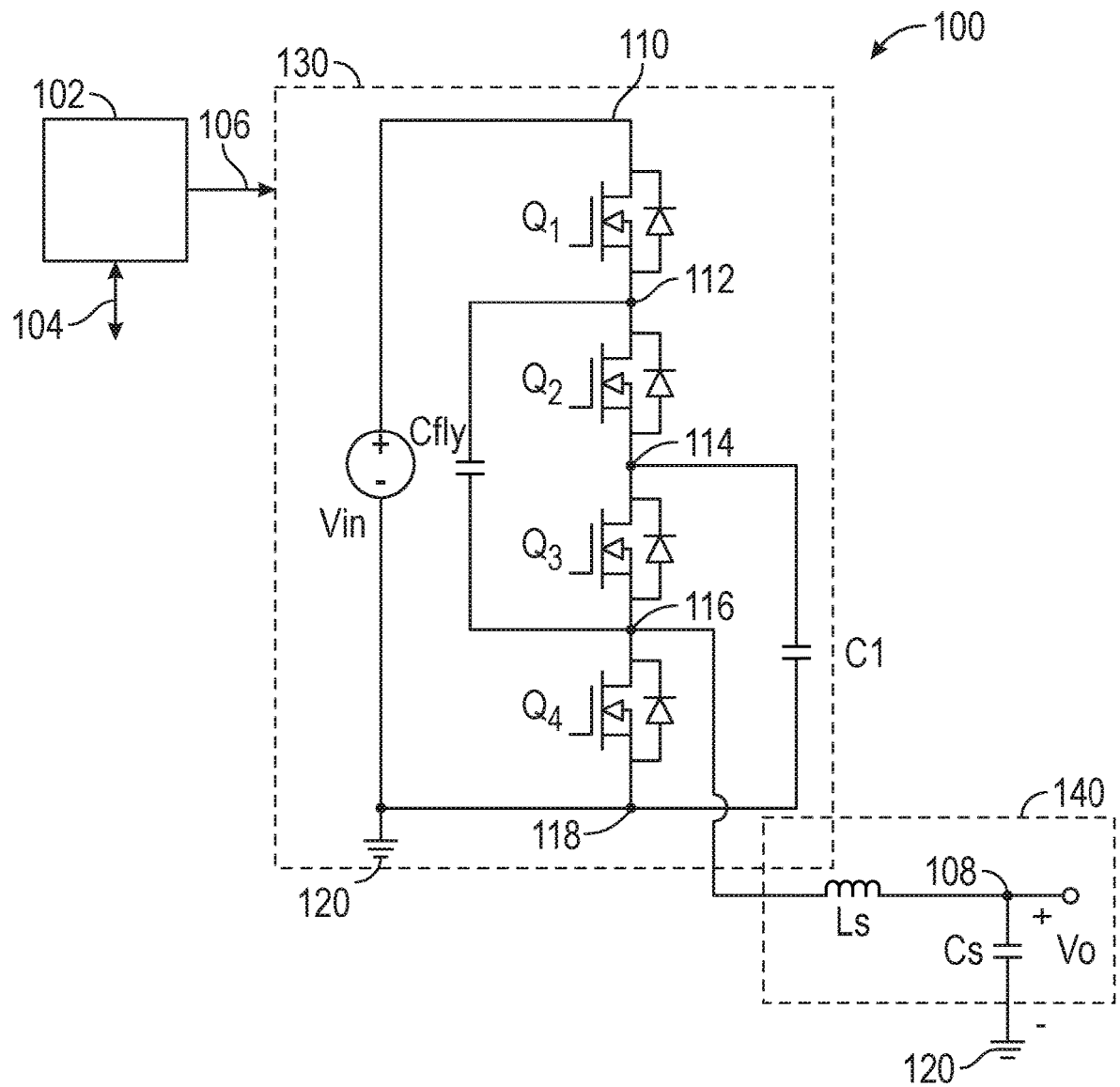
FIGS. 1A and 1B are circuit diagrams of an exemplary hybrid PWM buck converter and a switching signal of the hybrid PWM buck converter.
Figure 1B:
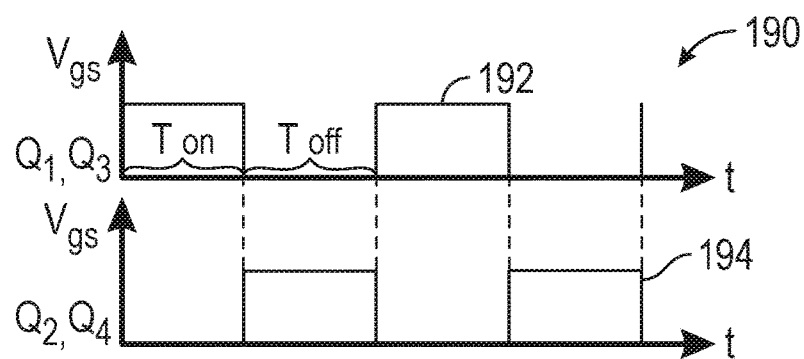

FIGS. 1A and 1B are circuit diagrams of an exemplary hybrid PWM buck converter and a switching signal of the hybrid PWM buck converter. FIG. 1A includes an exemplary hybrid PWM power converter, e.g., a hybrid PWM buck converter 100. In some examples, hybrid PWM buck converter 100 includes a switching circuit 130, which includes four switching transistors Q1, Q2, Q3, and Q4 that are connected in series. Switching transistors Q1 and Q3 may switch on or off complementary to switching transistors Q2 and Q4 according to a switching cycle (e.g., at a predetermined switching frequency and duty cycle) to drive LC circuit 140. In some examples, switching transistors Q1 and Q3 may switch on for a duration of Ton and may switch off for a duration of Toff providing duty cycle D=Ton/(Ton+Toff) for switching transistors Q1 and Q3. In some examples switching transistors Q1 and Q3 and switching transistors Q2 and Q4 may be switched at a 50% duty cycle, wherein the switching transistors Q1 and Q3 is switched on or off in phase opposition to switching transistors Q2 and Q4 for exactly the same time period. In some examples, the duty cycle D of the switching transistors Q1 and Q3 is less than 50% and the duty cycle of the switching transistors Q2 and Q4 is more than 50% or vice versa. LC circuit 140 includes one or more inductors Ls and one or more capacitors Cs that are energized by each pulse from switching circuit 130. In some embodiments, hybrid PWM buck converter 100 is an exemplary hybrid PWM buck converter and amplitude of the output voltage Vo is about ½ Vin times the duty cycle D. In some embodiments, capacitor Cs has a large value and provides filtering function, e.g., low pass filtering function, for the output voltage Vo of the hybrid PWM buck converter 100.

FIG. 1B includes switching signals 190 of hybrid PWM buck converter of FIG. 1A. Power flow through LC circuit 140 may be controlled by changing the switching duty cycle of switching transistors Q1 and Q3 and switching transistors Q2 and Q4 (e.g., by changing the duty cycle of the switching signals 192 and 194).

As shown in FIG. 1A, switching circuit 130 further includes nodes 112, 114, and 116 that are coupled between two switching transistors and link the two switching transistors. Switching circuit 130 also includes nodes 110 and 118 that are coupled to one switching transistor. Node 118 couples a transistor to ground 120 and node 110 couples a transistor to input source Vin that is coupled between node 110 and ground 120. Switching circuit 130 further includes flying capacitor Cfly that is coupled between nodes 112 and 116 and capacitor C1 that is coupled between nodes 114 and 118. In addition, LC circuit 140 is coupled between node 116 of switching circuit 130 and the ground. An output voltage is defined as the voltage across capacitor Cs that is coupled between node 108 of LC circuit 140 and ground 120.

Hybrid PWM converter 100 may include, as depicted in FIG. 1A, a control circuit 102 configured to provide the switching signals 106 that can be coupled to gates of the transistors Q1-Q4. Switching signals 106 may provide switching signals 192 and 194 that are square wave signals. In some examples, control circuit 102 controls the frequency and duty cycle of the switching signals 192 and 194. In some embodiments, the switching signals 106 of control circuit 102, in addition to providing the switching signals of the switching transistors may provide control signals to control other switches of the hybrid PWM converter 100 and may connect or disconnect a portion of the hybrid PWM converter 100.

According to various implementations, control circuit 102 may be a pulse-width modulation (PWM) controller that generates PWM signals to switching circuit 130 to switch the switching transistors (e.g., Q1-Q4) of the bridge on or off according to a predefined switching frequency and/or duty cycle. In this regard, control circuit 102 may include an input/output (I/O) interface 104, and may be programmed (e.g., before start-up of the converter) with a predetermined switching frequency and/or duty cycle, for example, by way of the I/O interface 104. Switching signals 106, e.g., control signals, may be transmitted as first switching signal 192 by control circuit 102 to the gates of switching transistors Q1 and Q3 to switch on Q1 and Q3, respectively, and transmitted at a second switching signal 194 to switch off the transistors Q2 and Q4.

In some embodiments, before switching of the switching transistor Q1-Q4, flying capacitor Cfly that is coupled between nodes 112 and 116 and capacitor C1 that is coupled between nodes 114 and 118 are each pre-charged to ½ of Vin via a separate circuit that is controlled by control circuit 102. The pre-charging of capacitors Cfly and C1 may reduce high voltage and/or current of switching transistors during a start-up of the converter. Pre-charging of the capacitors is described with respect to FIGS. 10A and 10B.

In some examples, a voltage and/or current, e.g., an output voltage and/or an output current of a hybrid converter, or a voltage or current of an element of a hybrid converter, e.g., hybrid converter 300, may be defined as within a percent range (e.g., 20 percent above or below) of a voltage value and/or current value that may be defined as an essentially constant voltage value and/or current value.

Figure 2A:
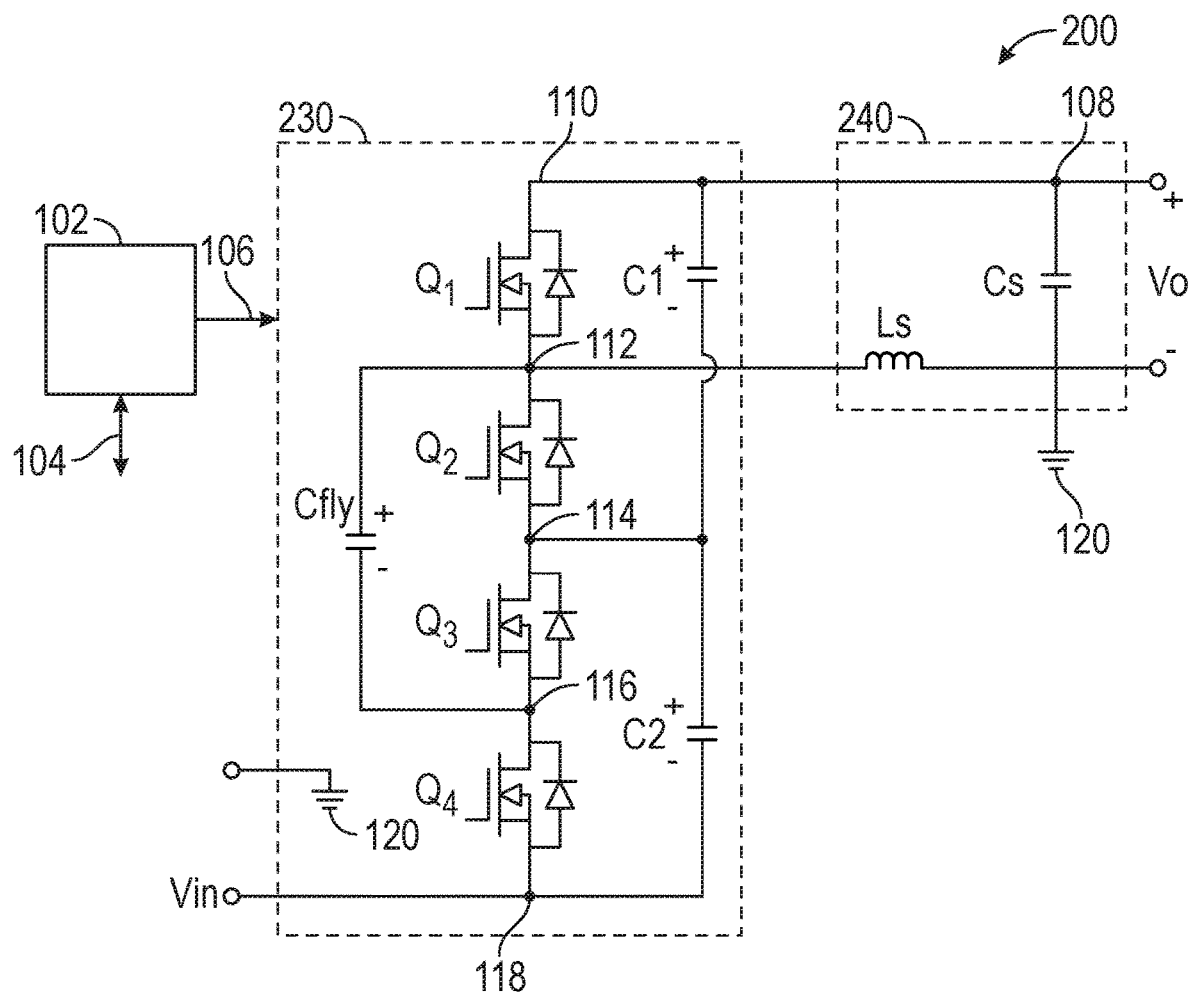
FIGS. 2A and 2B are diagrams of an exemplary hybrid inverting PWM buck converter and a switching signal of the hybrid inverting PWM buck converter.
Figure 2B:
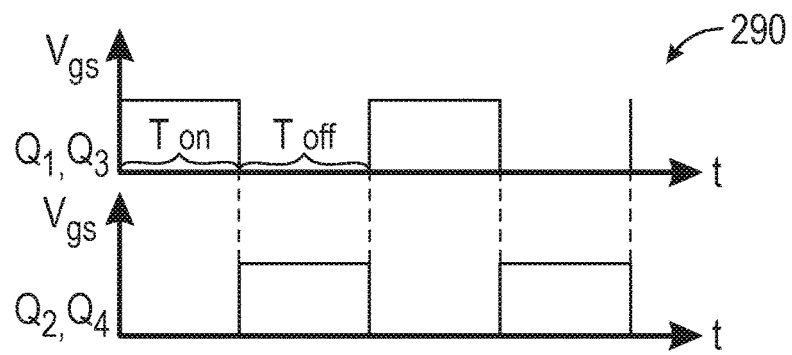

FIGS. 2A and 2B are diagrams of an exemplary hybrid inverting PWM buck converter and a switching signal of the hybrid inverting PWM buck converter. FIG. 2A includes an exemplary hybrid PWM buck converter 200. In some examples, hybrid PWM buck converter 200 includes a switching circuit 230, which includes four switching transistors Q1, Q2, Q3, and Q4 that are connected in series. Switching transistors Q1 and Q3 may switch on or off complementary to switching transistors Q2 and Q4 according to a switching cycle to drive LC circuit 240. In some examples, switching transistors Q1 and Q3 may switch on for a duration of Ton and may switch off for a duration of Toff providing duty cycle D=Ton/(Ton+Toff) for switching transistors Q1 and Q3 and providing duty cycle 1-D for Q2 and Q4. In some examples switching transistors Q1 and Q3 may be switched on or off in phase opposition to switching transistors Q2 and Q4. LC circuit 240 may include one or more inductors Ls and one or more capacitors Cs that are energized by each pulse from switching circuit 230. In some embodiments, hybrid PWM buck converter 200 is an exemplary hybrid PWM converter and amplitude of the output voltage Vo is about −Vin times (1-D) divided by (1+D). In some examples, when D is 50%, hybrid PWM buck converter 200 is an inverting buck converter providing an output amplitude of about −⅓ Vin. In some embodiments, capacitor Cs has a large value and provides filtering function, e.g., low pass filtering function, for the output voltage Vo of the hybrid PWM buck converter 200 and the LC circuit may generate an essentially constant output voltage. In some embodiments, the output voltage has a reverse polarity with respect to an input voltage Vin that is coupled to the primary switching circuit 230. In some examples, the output voltage level, Vo, can be adjusted by changing D between 0.1 and 0.9, e.g., by setting D=0.5.

FIG. 2B includes switching signals 290 of hybrid PWM buck converter of FIG. 2A that are provided by control circuit 102. Power flow through LC circuit 240 may be controlled by changing the switching duty cycle of switching transistors Q1 and Q3 and switching transistors Q2 and Q4.

As shown in FIG. 2A, switching circuit 230 includes nodes 112, 114, and 116 that are coupled between two switching transistors and link the two switching transistors. Switching circuit 230 also includes nodes 110 and 118 that are coupled to one switching transistor. Input source Vin is coupled between node 118 and ground 120 and thus is coupled between switching transistor Q4 and ground 120. Node 110 that is coupled to switching transistor Q1 is also coupled to LC circuit 240. In some embodiments, LC circuit 240 is coupled between nodes 110 and 112 of switching circuit 230 and the ground 120 as well. Switching circuit 230 further includes flying capacitor Cfly that is coupled between nodes 112 and 116, capacitor C1 that is coupled between nodes 110 and 114, and capacitor C2 that is coupled between nodes 114 and 118. An output voltage is defined as the voltage across capacitor Cs that is coupled between node 108 of LC circuit 240 and ground 120. In some embodiments, switching circuit 230 includes one of the capacitors C1 or C2. In some examples, capacitors C1, C2, and Cfly are between 1 micro farad and 20 micro farads, e.g. 8 micro farads or 16 micro farads.

In some embodiments, before switching of the switching transistors Q1-Q4, flying capacitor Cfly that is coupled between nodes 112 and 116, capacitor C1 that is coupled between nodes 110 and 114, and capacitor C2 that is coupled between nodes 114 and 118 are each pre-charged to ½ of (|Vin|+|Vo|) via a separate circuit that is controlled by control circuit 102. The pre-charging of capacitors Cfly, C1, C2 may limit high voltage or current of the switching transistors during a start-up of the converter. Pre-charging of the capacitors is described with respect to FIGS. 10A and 10B. In some embodiments, pre-charging may limit voltage value of switching transistors Q1-Q4 to ½(|Vin|+|Vo|).

Figure 3A:
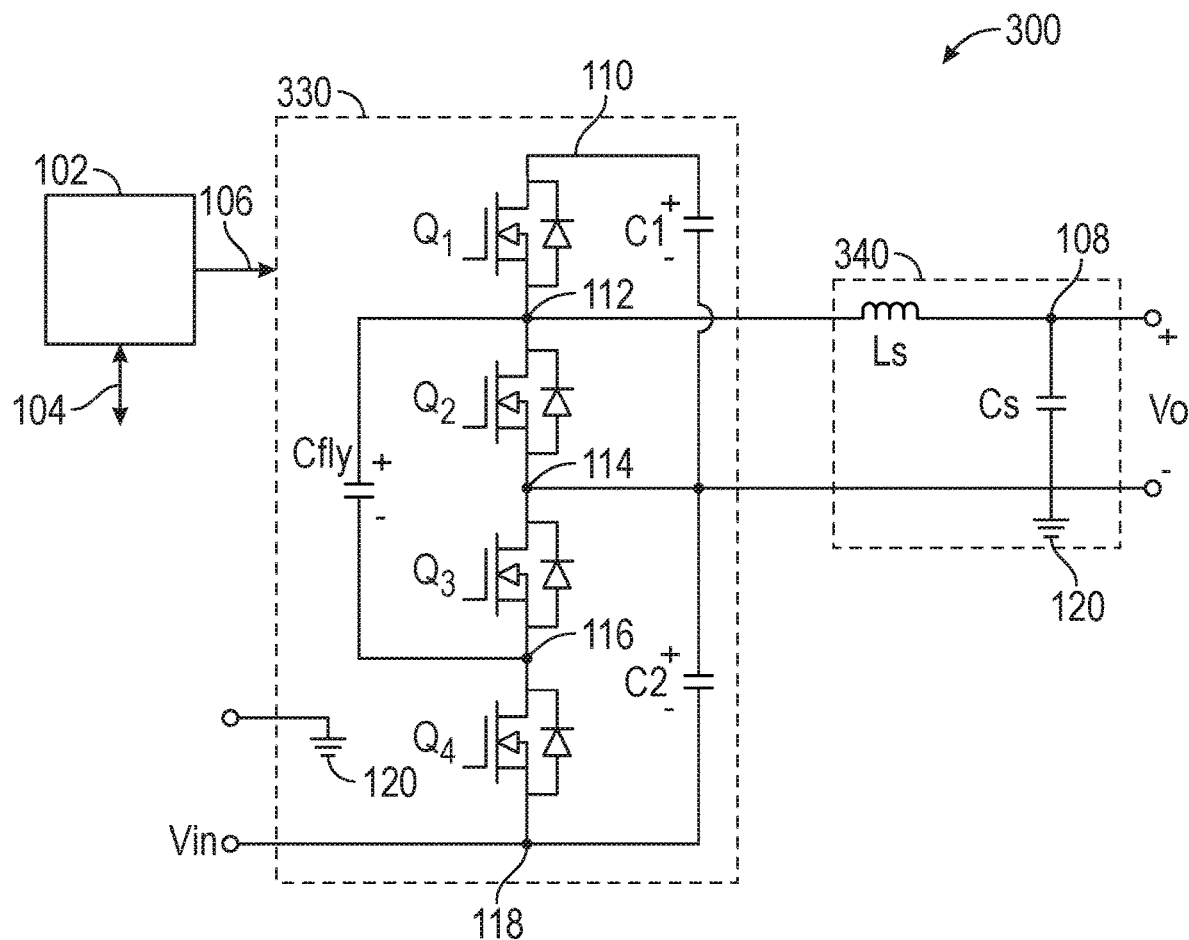
FIGS. 3A and 3B are diagrams of an exemplary hybrid inverting PWM buck converter and a switching signal of the hybrid inverting PWM buck converter.
Figure 3B:
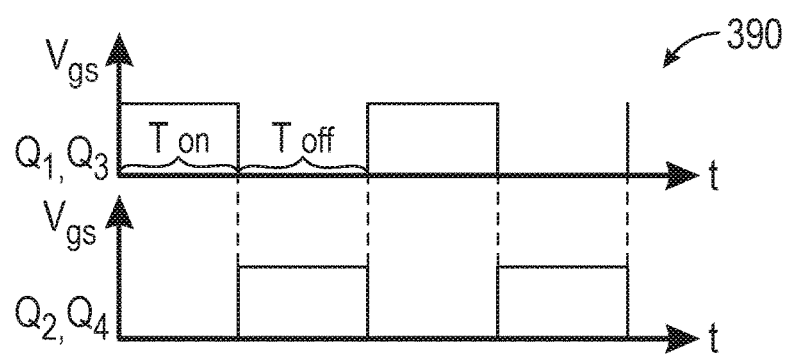

FIGS. 3A and 3B are diagrams of an exemplary hybrid inverting PWM buck converter and a switching signal of the hybrid inverting PWM buck converter. FIG. 3A includes an exemplary hybrid PWM buck converter 300. In some examples, hybrid PWM buck converter 300 includes a switching circuit 330, which includes four switching transistors Q1, Q2, Q3, and Q4 that are connected in series. Switching transistors Q1 and Q3 may switch on or off complementary to switching transistors Q2 and Q4 according to a switching cycle to drive LC circuit 340. In some examples, switching transistors Q1 and Q3 may switch on for a duration of Ton and may switch off for a duration of Toff providing duty cycle D=Ton/(Ton+Toff) for switching transistors Q1 and Q3 and providing duty cycle 1-D for Q2 and Q4. LC circuit 340 may include one or more inductors Ls and one or more capacitors Cs that are energized by each pulse from switching circuit 330. In some embodiments, hybrid PWM buck converter 300 is an exemplary hybrid PWM converter and amplitude of the output voltage Vo is about −Vin times D. In some examples, when D is 50%, hybrid PWM buck converter 300 is an inverting buck converter providing an output amplitude Vo that is about −½ Vin. In some embodiments, capacitor Cs has a large value and provides filtering function for the output voltage Vo of the hybrid PWM buck converter 300 and the LC circuit may generate an essentially constant output voltage. In some embodiments, the output voltage has a reverse polarity with respect to an input voltage Vin that is coupled to the primary switching circuit 330.

FIG. 3B includes switching signals 390 of hybrid PWM buck converter of FIG. 3A that are provided by control circuit 102. Power flow through LC circuit 340 may be controlled by changing the switching duty cycle of switching transistors Q1 and Q3 and switching transistors Q2 and Q4.

As shown in FIG. 3A, switching circuit 330 includes nodes 112, 114, and 116 that are coupled between two switching transistors and link the two switching transistors. Switching circuit 330 also includes nodes 110 and 118 that are coupled to one switching transistor. Input source Vin that is coupled between node 118 and ground 120 is thus coupled between switching transistor Q4 and ground 120. Node 112 that is coupled between switching transistors Q1 and Q2 is also coupled to LC circuit 340. In some embodiments, LC circuit 340 is coupled between nodes 112 and 114 of switching circuit 330 where node 114 is coupled to ground 120 and thus the input source Vin is coupled across two of the switching transistors Q3 and Q4. Switching circuit 330 further includes flying capacitor Cfly that is coupled between nodes 112 and 116, capacitor C1 that is coupled between nodes 110 and 114, and capacitor C2 that is coupled between nodes 114 and 118. An output voltage Vo may be provided as the voltage across capacitor Cs that is coupled between node 108 of LC circuit 340 and ground 120. In some embodiments, switching circuit 330 includes one of the capacitors C1 or C2.

In some embodiments, before switching of the switching transistors Q1-Q4, flying capacitor Cfly that is coupled between nodes 112 and 116, capacitor C1 that is coupled between nodes 110 and 114, and capacitor C2 that is coupled between nodes 114 and 118 are each pre-charged to |Vin| via a separate circuit that is controlled by control circuit 102. The pre-charging of capacitors Cfly, C1, C2 may reduce high voltage or current of the switching transistors during a start-up of the converter. Pre-charging of the capacitors is described with respect to FIGS. 10A and 10B. In some embodiments, pre-charging may limit voltage value of switching transistors Q1-Q4 to |Vin|.

Figure 4A:
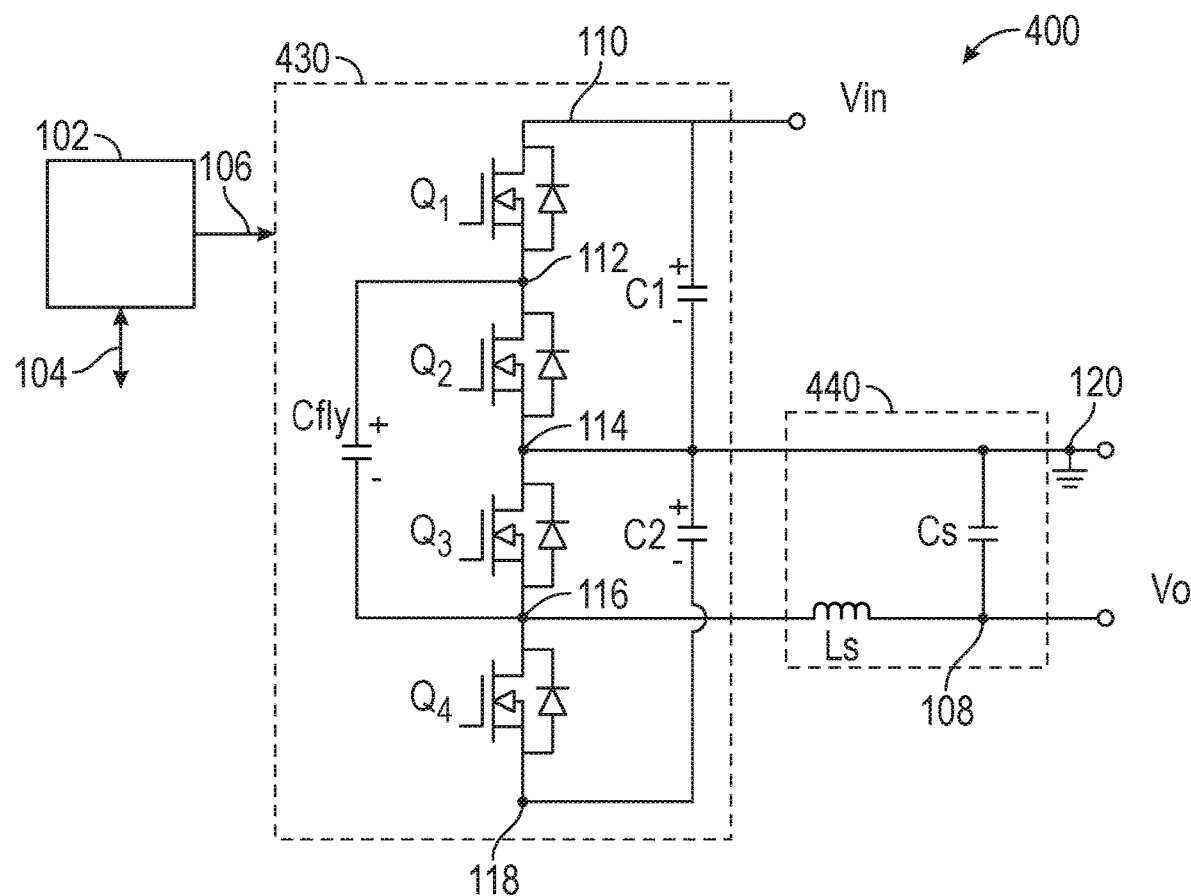
FIGS. 4A and 4B are diagrams of an exemplary hybrid inverting PWM buck converter and a switching signal of the hybrid inverting PWM buck converter.
Figure 4B:
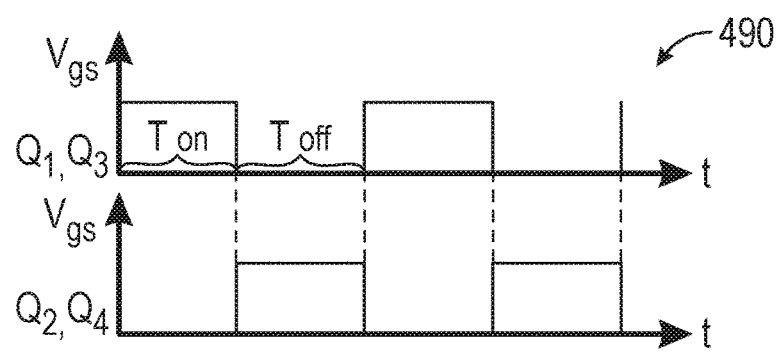

FIGS. 4A and 4B are diagrams of an exemplary hybrid inverting PWM buck converter and a switching signal of the hybrid inverting PWM buck converter. FIG. 4A includes an exemplary hybrid PWM buck converter 400. In some examples, hybrid PWM buck converter 400 includes a switching circuit 430, which includes four switching transistors Q1, Q2, Q3, and Q4 that are connected in series. Switching transistors Q1 and Q3 may switch on or off complementary to switching transistors Q2 and Q4 according to a switching cycle to drive LC circuit 440. In some examples, switching transistors Q1 and Q3 may switch on for a duration of Ton and may switch off for a duration of Toff providing duty cycle D=Ton/(Ton+Toff) for switching transistors Q1 and Q3 and providing duty cycle 1-D for Q2 and Q4. LC circuit 440 may include one or more inductors Ls and one or more capacitors Cs that are energized by each pulse from switching circuit 330. In some embodiments, hybrid PWM buck converter 400 is an exemplary hybrid PWM converter and amplitude of the output voltage Vo is about −Vin times (1-D). In some examples, when D is 50%/o, hybrid PWM buck converter 400 is an inverting buck converter providing an output amplitude Vo that is about −½ Vin. In some embodiments, capacitor Cs has a large value and provides filtering function for the output voltage Vo of the hybrid PWM buck converter 400 and the LC circuit may generate an essentially constant output voltage. In some embodiments, the output voltage has a reverse polarity with respect to an input voltage Vin that is coupled to the primary switching circuit 430.

FIG. 4B includes switching signals 490 of hybrid PWM buck converter of FIG. 4A that are provided by control circuit 102. Power flow through LC circuit 340 may be controlled by changing the switching duty cycle of switching transistors Q1 and Q3 and switching transistors Q2 and Q4.

As shown in FIG. 4A, switching circuit 430 includes nodes 112, 114, and 116 that are coupled between two switching transistors and link the two switching transistors. Switching circuit 430 also includes nodes 110 and 118 that are coupled to one switching transistor. Input source Vin that is coupled between node 110 and ground 120 is thus coupled between switching transistor Q1 and ground 120. Node 114 that is coupled between switching transistors Q2 and Q3 is also coupled to LC circuit 440. In some embodiments, LC circuit 440 is coupled between nodes 114 and 116 of switching circuit 430 where node 114 is coupled to ground 120 and thus the input source Vin is coupled across two of the switching transistors Q1 and Q2. Switching circuit 430 further includes flying capacitor Cfly that is coupled between nodes 112 and 116, capacitor C1 that is coupled between nodes 110 and 114, and capacitor C2 that is coupled between nodes 114 and 118. An output voltage Vo may be defined as the voltage across capacitor Cs that is coupled between node 108 of LC circuit 340 and ground 120. In some embodiments, switching circuit 430 includes one of the capacitors C1 or C2.

In some embodiments, before switching of the switching transistors Q1-Q4, flying capacitor Cfly that is coupled between nodes 112 and 116, capacitor C1 that is coupled between nodes 110 and 114, and capacitor C2 that is coupled between nodes 114 and 118 are each pre-charged to |Vin| via a separate circuit that is controlled by control circuit 102. The pre-charging of capacitors Cfly, C1, C2 may limit, e.g., reduce, high voltage or current of the switching transistors during a start-up of the converter. Pre-charging of the capacitors is described with respect to FIGS. 10A and 10B. In some embodiments, pre-charging may limit voltage value of switching transistors Q1-Q4 to |Vin|.

Figure 5A:
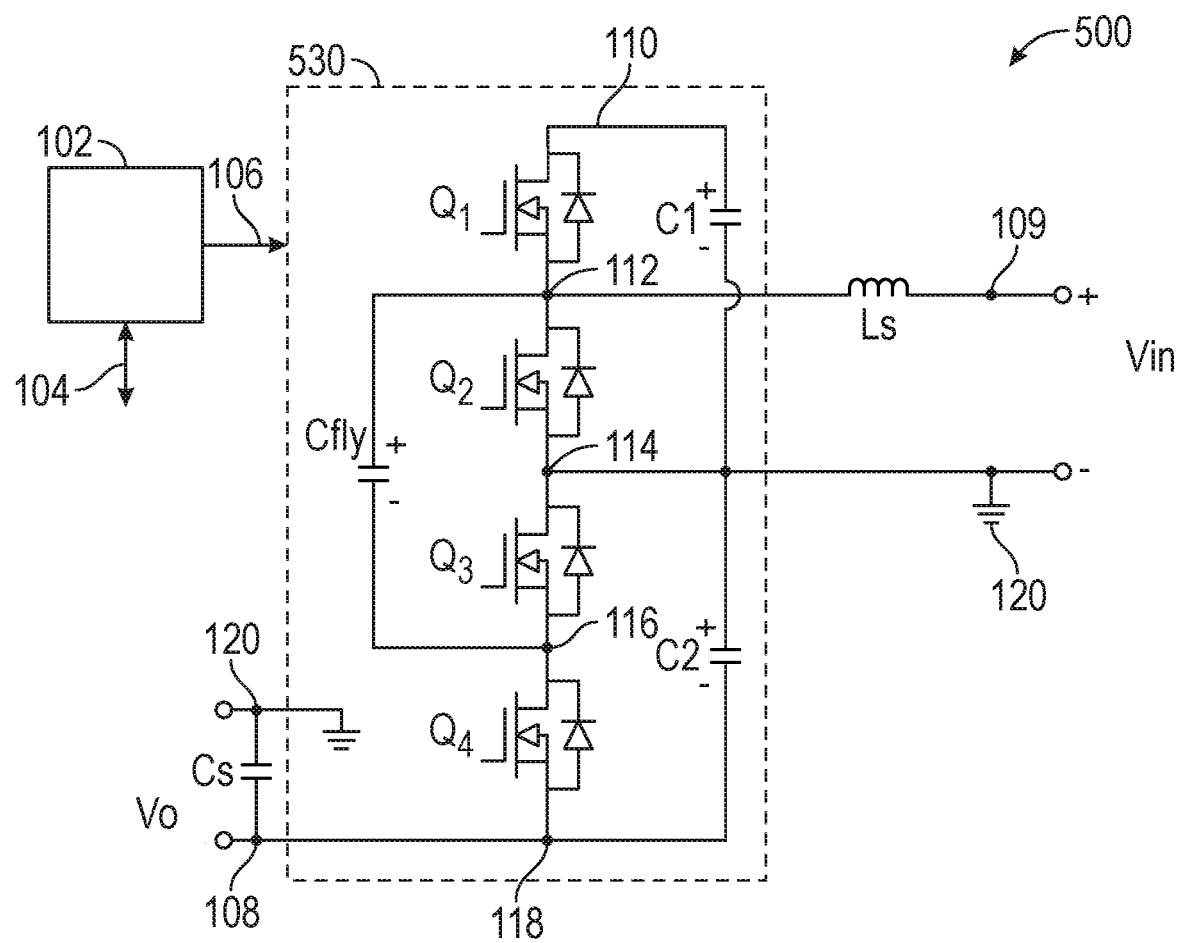
FIGS. 5A and 5B are diagrams of an exemplary hybrid inverting PWM boost converter and a switching signal of the hybrid inverting PWM boost converter.
Figure 5B:
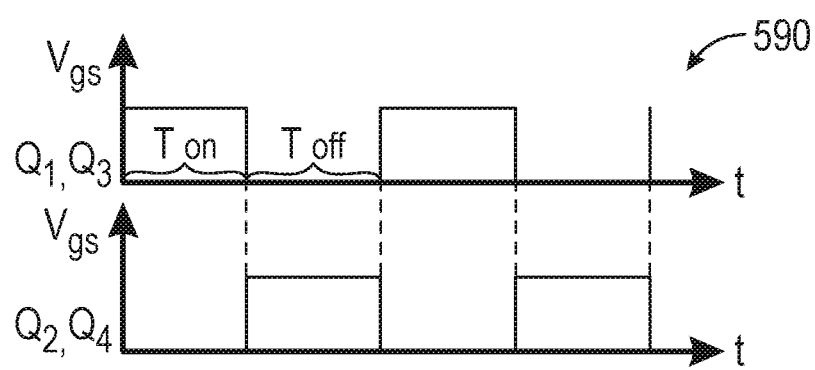

FIGS. 5A and 5B are diagrams of an exemplary hybrid inverting PWM boost converter and a switching signal of the hybrid inverting PWM boost converter. FIG. 5A includes the same components of FIG. 3A with the exception that capacitor Cs instead of being coupled between nodes 108 and ground 120 is coupled between node 118 and ground 120. Input source Vin is coupled between nodes 108 and ground 120 and output voltage Vo is defined across capacitor Cs from node 118 to ground 120. In some embodiments, the output voltage has a reverse polarity with respect to an input voltage Vin. In some embodiments, FIG. 5A includes hybrid PWM boost converter 500 that generated an output voltage Vo having an amplitude that is −Vin divided by (1-D). In some examples, when D is 50%, hybrid PWM boost converter 500 is an inverting boost converter providing an output amplitude Vo that is Vo=−2*Vin.

FIG. 5B includes a diagram 590 of exemplary a switching signals of hybrid PWM boost converter of FIG. 5A that are provided by control circuit 102. Power flow through LC circuit 540 may be controlled by changing the switching frequency of switching transistors Q1 and Q3 and switching transistors Q2 and Q4, changing the duty cycle, or both.

In some embodiments, before switching of the switching transistors Q1-Q4, flying capacitor Cfly that is coupled between nodes 112 and 116, capacitor C1 that is coupled between nodes 110 and 114, and capacitor C2 that is coupled between nodes 114 and 118 are each pre-charged to |Vo| via a separate circuit that is controlled by control circuit 102. The pre-charging of capacitors Cfly, C1, C2 may reduce high voltage and/or current of switching transistors during a start-up of the converter. In some embodiments, switching circuit 530 includes one of the capacitors C1 or C2. Pre-charging of the capacitors is described with respect to FIGS. 10A and 10B. In some embodiments, pre-charging may limit voltage value of switching transistors Q1-Q4 to |Vo|.

FIGS. 6A and 6B are diagrams of an exemplary hybrid inverting PWM buck converter and a switching signal of the hybrid inverting PWM buck converter. FIG. 6A includes an exemplary hybrid PWM buck converter 600. In some examples, hybrid PWM buck converter 600 includes a primary switching circuit 630, which includes four switching transistors Q1, Q2, Q3, and Q4 that are connected in series. Switching transistors Q1 and Q3 may switch on or off complementary to switching transistors Q2 and Q4 according to a switching cycle to drive LC circuit 640. In some examples, switching transistors Q1 and Q3 may switch on for a duration of Ton and may switch off for a duration of Toff providing duty cycle D=Ton/(Ton+Toff) for switching transistors Q1 and Q3 and providing duty cycle 1-D for Q2 and Q4. In some examples, hybrid PWM buck converter 600 includes one secondary switching circuit 655, which includes two switching transistors Q5 and Q6. Switching transistor Q5 may switch in synchronization with Q1 and Q3 and switching transistor Q6 may switch in synchronization with transistors Q2 and Q4 according to a switching cycle to drive LC circuit 640. The secondary switching circuit may adjust a series of voltage pulses received from the primary switching circuit 630 to provide the series of voltage pulses to the LC circuit. LC circuit 640 may include one or more inductors Ls and one or more capacitors Cs that are energized by each pulse from primary switching circuit 630. In some embodiments, hybrid PWM buck converter 600 is an exemplary hybrid PWM converter and amplitude of the output voltage Vo is about −½Vin times D. In some examples, when D is 50%, hybrid PWM buck converter 600 is an inverting buck converter providing an output amplitude Vo that is about −¼Vin. In some embodiments, capacitor Cs has a large value and provides filtering function for the output voltage Vo of the hybrid PWM buck converter 600 and the LC circuit may generate an essentially constant output voltage. In some embodiments, the output voltage has a reverse polarity with respect to an input voltage Vin that is coupled to the primary switching circuit 630.

FIG. 6B includes switching signals 690 of hybrid PWM buck converter of FIG. 6A that are provided by control circuit 102. Power flow through LC circuit 640 may be controlled by changing the switching duty cycle of switching transistors Q1, Q3.

As shown in FIG. 6A, primary switching circuit 630 includes nodes 112, 114, and 116 that are coupled between two switching transistors and link the two switching transistors. Primary switching circuit 630 also includes nodes 110 and 118 that are coupled to one switching transistor. Input source Vin is coupled between node 118 and node 110 where node 110 is coupled to ground 120 and thus source Vin is coupled across switching transistors Q1-Q4. Node 112 that is coupled between switching transistors Q1 and Q2 is also coupled to secondary switching circuit 655 and the secondary switching circuit 655 is coupled to LC circuit 640. In some embodiments, LC circuit 640 is coupled between nodes 602 of secondary switching circuit 655 and ground 120. Primary switching circuit 630 further includes first flying capacitor Cfly1 that is coupled between nodes 112 and 116, capacitor C1 that is coupled between nodes 110 and 114, and capacitor C2 that is coupled between nodes 114 and 118. In some embodiments, secondary switching circuit 655 is coupled between primary switching circuit 630 and LC circuit 640. Secondary switching circuit 655 includes node 602 that is coupled between two switching transistors Q5 and Q6 and links the two switching transistors. Secondary switching circuit 655 also includes node 604 that is coupled to switching transistor Q5. Switching transistor Q6 of secondary switching circuit 655 is coupled between node 602 and ground 120. Secondary switching circuit 655 further includes second flying capacitor Cfly2 that is coupled between nodes 112 and 602 and capacitor C3 that is coupled between nodes 604 and ground 120. In some examples, secondary switching circuit 655 may create a path for discharging the pulses received from primary switching circuit 630 to ground and thus reducing output voltage Vo. An output voltage Vo may be defined as the voltage across capacitor Cs that is coupled between node 108 of LC circuit 640 and ground 120. In some embodiments, switching circuit 630 includes one of the capacitors C1 or C2.

In some embodiments, before switching of the switching transistors Q1-Q6, first flying capacitor Cfly1 that is coupled between nodes 112 and 116, capacitor C1 that is coupled between nodes 110 and 114, capacitor C2 that is coupled between nodes 114 and 118, second flying capacitor Cfly2 that is coupled between nodes 112 and 602, and capacitor C3 that is coupled between nodes 604 and ground 120 each may be pre-charged to $\frac{1}{2}*|Vin|$ via a separate circuit that is controlled by control circuit 102. The pre-charging of capacitors Cfly1, Cfly2, C1, C2, and C3 may reduce high voltage and/or current of switching transistors during a start-up of the converter. Pre-charging of the capacitors is described with respect to FIGS. 10A and 10B. In some embodiments, pre-charging may limit voltage value of switching transistors Q1-Q6 to $\frac{1}{2}*|Vin|$.

Figure 7A:
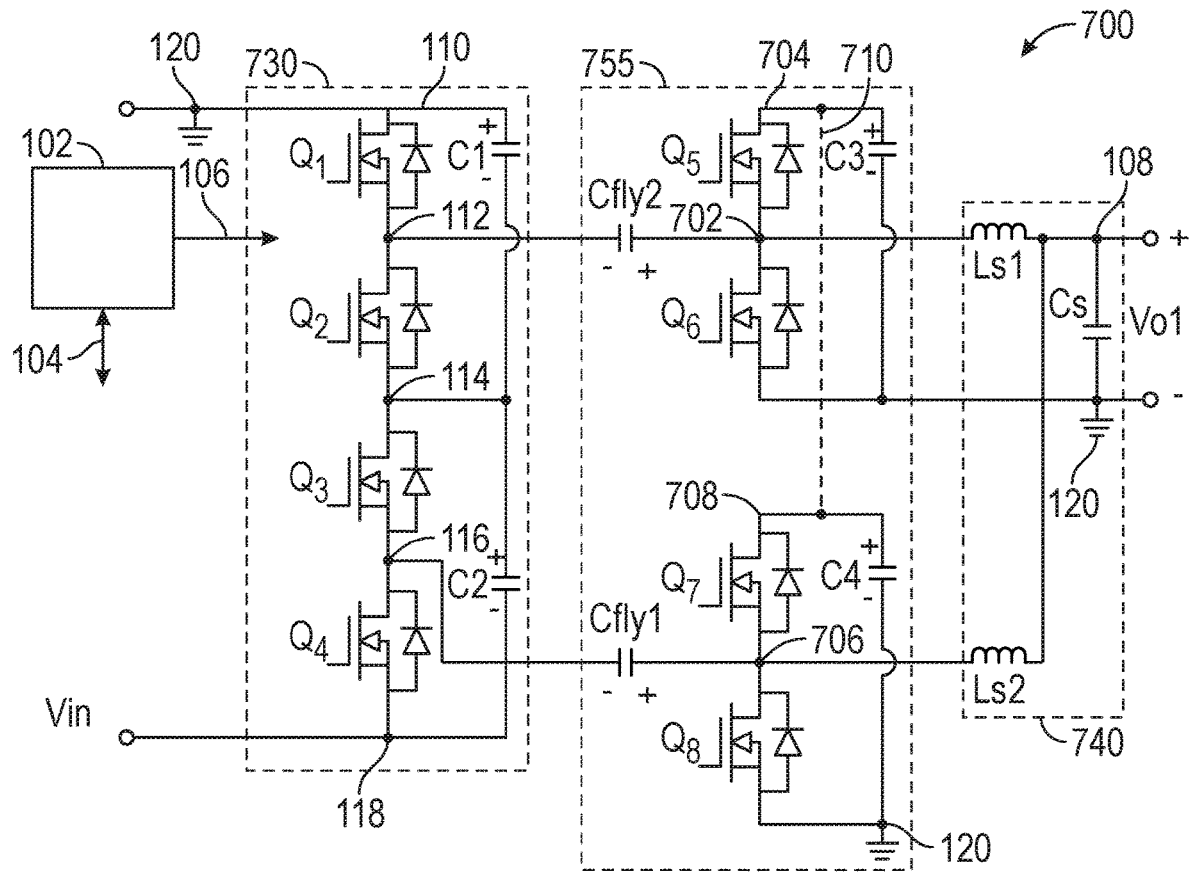
FIGS. 7A and 7B are diagrams of an exemplary hybrid inverting PWM buck converter and a switching signal of the hybrid inverting PWM buck converter.
Figure 7B:
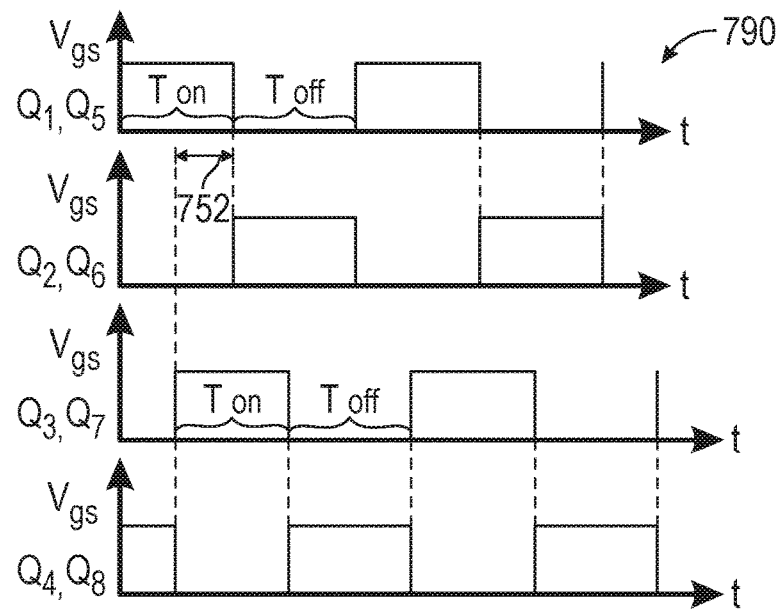

FIGS. 7A and 7B are diagrams of an exemplary hybrid inverting PWM buck converter and a switching signal of the hybrid inverting PWM buck converter. FIG. 7A includes an exemplary hybrid PWM buck converter 700. In some examples, hybrid PWM buck converter 700 includes a primary switching circuit 730, which includes four switching transistors Q1, Q2, Q3, and Q4 that are connected in series. Switching transistor Q1 may switch on or off complementary to switching transistor Q2 according to a switching cycle to drive LC circuit 740. Additionally, switching transistor Q3 may switch on or off complementary to switching transistor Q4 according to the switching cycle to drive LC circuit 740. In some examples, however, as shown in FIG. 7B, there is a time delay 752, e.g., a phase difference, between switching signals of switching transistors Q1 and Q3 and thus Q2 and Q4. In some examples, the time delay is used to control a ripple of a DC output voltage of the hybrid inverting PWM power converter. In some examples, switching transistors Q1, Q3, Q5, and Q7 may switch on for a duration of Ton and may switch off for a duration of Toff providing duty cycle D=Ton/(Ton+Toff) for switching transistors Q1, Q3, Q5, and Q7 and providing duty cycle 1-D for Q2, Q4, Q6, and Q8. In some examples, the phase difference between switching signals of switching transistors Q1 and Q3 and thus Q2 and Q4 is less than 180 degrees. In some embodiments, the switching cycle includes one or more switching duty cycles for the switching transistors Q1-Q8. In some examples, one or more duty cycles are equal or complementary.

In some examples, hybrid PWM buck converter 700 includes a switching circuit 755, which includes two secondary switching circuits with four switching transistors Q5, Q6, Q7 and Q8. Switching transistor Q5 may switch in synchronization with Q1 and switching transistor Q6 may switch in synchronization with Q2. Switching transistor Q7 may switch in synchronization with Q3 and switching transistor Q8 may switch in synchronization with Q4 according to a switching cycle to drive switching circuit 755. LC circuit 740 may include one or more inductors, e.g., two inductors Ls1 and Ls2, and one or more capacitors, e.g., one capacitor Cs, that are energized by each pulse from primary switching circuit 730 and via switching circuit 755. In some embodiments, hybrid PWM buck converter 700 is an exemplary hybrid PWM converter and amplitude of the output voltage Vo is about $-\frac{1}{2}$Vin times D. In some examples, when D is 50%, hybrid PWM buck converter 700 is an inverting buck converter providing an output amplitude Vo that is about $-\frac{1}{4}$Vin. In some embodiments, capacitor Cs has a large value and provides filtering function for the output voltage Vo of the hybrid PWM buck converter 700 and the LC circuit may generate an essentially constant output voltage. In some embodiments, the output voltage has a reverse polarity with respect to an input voltage Vin that is coupled to the primary switching circuit 730.

FIG. 7B includes switching signals 790 of hybrid PWM buck converter of FIG. 7A that are provided by control circuit 102. Power flow through LC circuit 740 may be controlled by changing the switching duty cycle of switching transistors Q1, and Q5, Q2 and Q6, Q3 and Q7, and Q4 and Q8.

As shown in FIG. 7A, primary switching circuit 730 includes nodes 112, 114, and 116 that are coupled between two switching transistors and link the two switching transistors. Primary switching circuit 730 also includes nodes 110 and 118 that are coupled to one switching transistor. Input source Vin is coupled between node 118 and node 110 where node 110 is coupled to ground 120 and thus source Vin is coupled across switching transistors Q1-Q4. Node 112 that is coupled between switching transistors Q1 and Q2 is also coupled to a first secondary switching circuit and the first secondary switching circuit is coupled to LC circuit 740. In some embodiments, LC circuit 740 is coupled between node 702 of first secondary switching circuit and ground 120 and node 706 of second secondary switching circuit and ground 120. Primary switching circuit 730 includes capacitor C1 that is coupled between nodes 110 and 114, and capacitor C2 that is coupled between nodes 114 and 118. Switching circuit 755 includes first flying capacitor Cfly1 that is coupled between nodes 116 and 706 of second secondary switching circuit, second flying capacitor Cfly2 that is coupled between nodes 112 and 702 of first secondary switching circuit. In some embodiments, switching circuit 755 is coupled between primary switching circuit 730 and LC circuit 740. Switching circuit 755 includes node 702 that is coupled between two switching transistors Q5 and Q6 and links the two switching transistors. Switching circuit 755 also includes node 704 that is coupled to switching transistor Q5. Switching transistor Q6 of switching circuit 755 is coupled between node 702 and ground 120. Switching circuit 755 further includes capacitor C3 that is coupled between nodes 704 and ground 120 and also includes capacitor C4 that is coupled between nodes 708 and ground 120. In some examples, switching circuit 755 may create a path for discharging the pulses received from primary switching circuit 730 to ground and thus reducing output voltage Vo. An output voltage Vo may be defined as the voltage across capacitor Cs that is coupled between node 108 of LC circuit 740 and ground 120. In some examples, nodes 704 and 708 are coupled via connection 710 and thus capacitors C3 and C4 may be coupled in parallel. In some embodiments, switching circuit 730 includes one of the capacitors C1 or C2.

In some embodiments, before switching of the switching transistors Q1-Q8, second flying capacitor Cfly2 that is coupled between nodes 112 and 702, capacitor C1 that is coupled between nodes 110 and 114, capacitor C2 that is coupled between nodes 114 and 118, capacitor C3 that is coupled between nodes 704 and ground 120, and capacitor C4 that is coupled between nodes 708 and ground 120 each may be pre-charged to $\frac{1}{2}*|Vin|$, and first flying capacitor Cfly that is coupled between nodes 116 and 706 may be pre-charged to $|Vin|$, via a separate circuit that is controlled by control circuit 102. The pre-charging of capacitors Cfly1, Cfly2, C1, C2, C3, and C4 may reduce high voltage and/or current of switching transistors during a start-up of the converter. Pre-charging of the capacitors is described with respect to FIGS. 10A and 10B. In some embodiments, pre-charging may limit voltage value of switching transistors Q1-Q8 to $\frac{1}{2}*|Vin|$.

FIGS. 8A and 8B are diagrams of an exemplary hybrid inverting PWM buck converter and a switching signal of the hybrid inverting PWM buck converter. FIG. 8A includes an exemplary hybrid PWM buck converter 800. In some examples, hybrid PWM buck converter 800 includes a primary switching circuit 830, which includes three switching transistors Q1, Q2, and Q4 that are connected in series. Switching transistor Q1 and Q4 may switch on or off synchronously and switching transistor Q2 may switch on or off with a time delay 892, e.g., a phase difference, with respect to switching transistors Q1 and Q4 according to a switching cycle as shown in FIG. 8B to drive LC circuit 840. In some examples, the time delay is used to control a ripple of a DC output voltage of the hybrid inverting PWM power converter. In some examples, switching transistors Q1, Q2, Q4, Q5, and switching transistor Q7 may switch on for a duration of Ton and may switch off for a duration of Toff providing duty cycle D=Ton/(Ton+Toff) for switching transistors Q1, Q2, Q4, Q5, and Q7 and providing duty cycle 1-D for Q6 and Q8. In some examples, duty cycle D is limited to a value of less or equal to 0.5.

In some examples, hybrid PWM buck converter 800 includes a switching circuit 855, which includes two secondary switching circuits with four switching transistors Q5, Q6, Q7 and Q8. Switching transistor Q5 may switch in synchronization with Q1 and switching transistor Q6 may switch in phase opposition to switching transistors Q1 and Q5. Switching transistor Q7 may switch in synchronization with Q2 and switching transistor Q8 may switch in phase opposition to switching transistors Q2 and Q7 according to a switching cycle to drive switching circuit 855. LC circuit 840 may include one or more inductors, e.g., two inductors Ls1 and Ls2, and one or more capacitors, e.g., one capacitor Cs, that are energized by each pulse from primary switching circuit 830 and via switching circuit 855. In some embodiments, hybrid PWM buck converter 800 is an exemplary hybrid PWM converter and amplitude of the output voltage Vo is about -½Vin times D. In some examples, when D is 50%, hybrid PWM buck converter 800 is an inverting buck converter providing an output amplitude Vo that is about -¼Vin. In some embodiments, capacitor Cs has a large value and provides filtering function for the output voltage Vo of the hybrid PWM buck converter 800 and the LC circuit may generate an essentially constant output voltage. In some embodiments, the output voltage has a reverse polarity with respect to an input voltage Vin that is coupled to the primary switching circuit 830.

FIG. 8B includes switching signals 890 of hybrid PWM buck converter of FIG. 8A that are provided by control circuit 102. Power flow through LC circuit 840 may be controlled by changing the switching duty cycle of switching transistors Q1, Q4, Q5, Q6, Q2, Q7, and Q8.

As shown in FIG. 8A, primary switching circuit 830 includes nodes 112, and 114 that are coupled between two switching transistors and link the two switching transistors. Primary switching circuit 830 also includes nodes 110 and 118 that are coupled to one switching transistor. Input voltage source Vin is coupled between node 118 and node 110 where node 110 is coupled to ground 120 and thus input source Vin is coupled across switching transistors Q1, Q2, and Q4. Node 112 that is coupled between switching transistors Q1 and Q2 is also coupled to a first secondary switching circuit and the first secondary switching circuit is coupled to LC circuit 840. In some embodiments, LC circuit 840 is coupled between node 802 of first secondary switching circuit and ground 120 and node 806 of second secondary switching circuit and ground 120. Switching circuit 855 includes first flying capacitor Cfly1 that is coupled between nodes 114 and 806 and second flying capacitor Cfly2 that is coupled between nodes 112 and 802. In some embodiments, switching circuit 855 is coupled between primary switching circuit 830 and LC circuit 840. Switching circuit 855 includes node 802 that is coupled between two switching transistors Q5 and Q6 and links the two switching transistors. Switching circuit 855 also includes node 804 that is coupled to switching transistor Q5. Switching transistor Q6 of switching circuit 855 is coupled between node 802 and ground 120. Switching circuit 855 further includes capacitor C1 that is coupled between nodes 804 and ground 120 and also includes capacitor C2 that is coupled between nodes 808 and ground 120. In some examples, switching circuit 855 may create a path for discharging the pulses received from primary switching circuit 830 to ground and thus reducing output voltage Vo. An output voltage Vo may be defined as the voltage across capacitor Cs that is coupled between node 108 of LC circuit 840 and ground 120. In some examples, nodes 804 and 808 are coupled via connection 810 and thus capacitors C1 and C2 may be coupled in parallel.

In some embodiments, before switching of the switching transistors Q1, Q2, and Q4-Q8, second flying capacitor Cfly2 that is coupled between nodes 112 and 802, capacitor C1 that is coupled between nodes 804 and ground 120, and capacitor C2 that is coupled between nodes 808 and ground 120 each may be pre-charged to ½*|Vin|, and first flying capacitor Cfly1 that is coupled between nodes 114 and 806 may be pre-charged to |Vin|, via a separate circuit that is controlled by control circuit 102. The pre-charging of capacitors Cfly1, Cfly2, C1, and C2 may reduce high voltage and/or current of switching transistors during a start-up of the converter. Pre-charging of the capacitors is described with respect to FIGS. 10A and 10B. In some embodiments, pre-charging may limit voltage value of switching transistors Q1 and Q4-Q8 to ½*|Vin| and may limit voltage value of switching transistor Q2 to |Vin|.

Figure 9A:
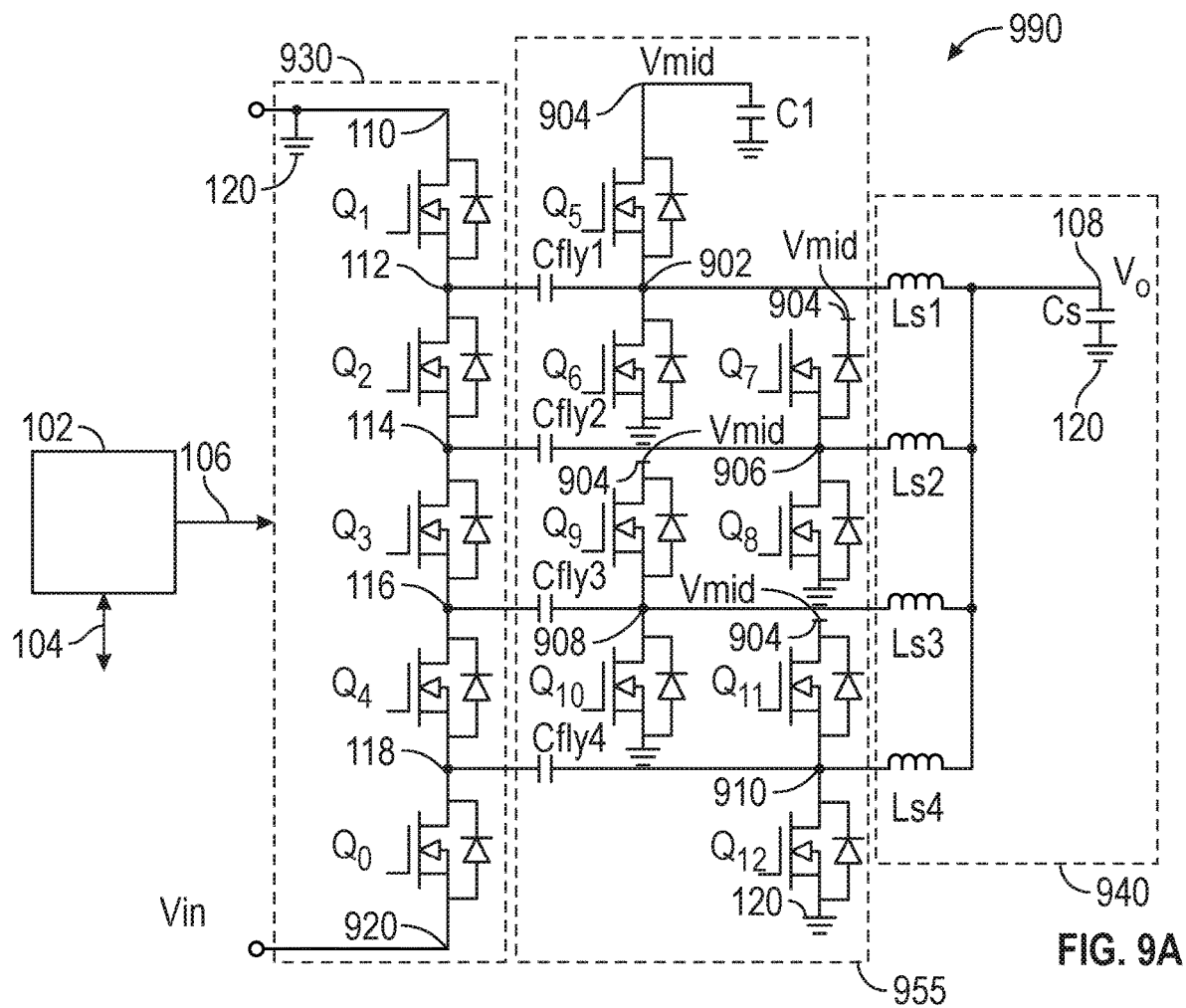
FIGS. 9A and 9B are diagrams of an exemplary hybrid inverting PWM buck converter and a switching signal of the hybrid inverting PWM buck converter.
Figure 9B:
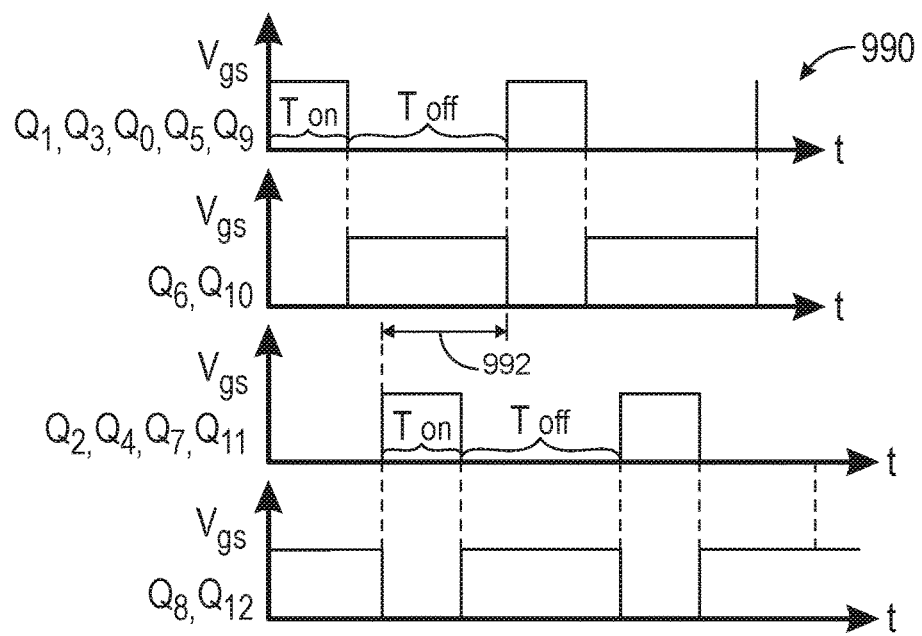

FIGS. 9A and 9B are diagrams of an exemplary hybrid inverting PWM buck converter and a switching signal of the hybrid inverting PWM buck converter. FIG. 9A includes an exemplary hybrid PWM buck converter 900. In some examples, hybrid PWM buck converter 900 includes a primary switching circuit 930, which includes four switching transistors Q1, Q2, Q3, Q4, and Q0 that are connected in series. Switching transistor Q1 may switch on or off in synchronization with switching transistors Q3 and Q0 according to a switching cycle to drive LC circuit 940. Additionally, switching transistor Q2 may switch on or off in synchronization with switching transistor Q4 according to the switching cycle to drive LC circuit 940. In some examples, however, as shown in FIG. 9B, there is a time delay 992, e.g., a phase difference, between switching signals of switching transistors Q1, Q3, and Q0 with switching signals of switching transistors Q2 and Q4. In some examples, the time delay is used to control a ripple of a DC output voltage of the hybrid inverting PWM power converter. In some examples, switching transistors Q1, Q2, Q3, Q4, and Q0 may switch on for a duration of Ton and may switch off for a duration of Toff providing duty cycle D=Ton/(Ton+Toff) for switching transistors Q0, Q1, Q2, Q3, Q4, Q5, Q7, Q9, and Q11 and providing duty cycle 1-D for Q6, Q8, Q10, and Q12. In some examples, the phase difference between switching signals of switching transistors Q1, Q3, and Q0 with switching signals of switching transistors Q2 and Q4 is less than 180 degrees. In some examples, duty cycle D is limited to a value of less or equal to 0.5.

In some examples, hybrid PWM buck converter 900 includes a switching circuit 955, which includes four secondary switching circuits with eight switching transistors Q5, Q6, Q7, Q8, Q9, Q10, Q11, and Q12. Switching transistors Q5 and Q9 may switch on or off in synchronization with Q1 and switching transistors Q6 and Q10 may switch on or off complementary to switching transistors Q5 and Q9. Switching transistor Q7 and Q11 may switch in synchronization with switching transistors Q2 and Q4 and switching transistors Q8 and Q12 may switch on or off complementary to switching transistors Q7 and Q11 according to a switching cycle to drive switching circuit 955. LC circuit 940 may include one or more inductors, e.g., four inductors Ls, Ls2, Ls3 and Ls4, and one or more capacitors, e.g., one capacitor Cs, that are energized by each pulse from primary switching circuit 930 and via switching circuit 955. In some embodiments, hybrid PWM buck converter 900 is an exemplary hybrid PWM converter and amplitude of the output voltage Vo is about −¼Vin times D. In some examples, when D is 50%, hybrid PWM buck converter 900 is an inverting buck converter providing an output amplitude Vo that is about −⅛Vin. In some embodiments, capacitor Cs has a large value and provides filtering function for the output voltage Vo of the hybrid PWM buck converter 900 and the LC circuit may generate an essentially constant output voltage. In some embodiments, the output voltage has a reverse polarity with respect to an input voltage Vin that is coupled to the primary switching circuit 930.

FIG. 9B includes switching signals 990 of hybrid PWM buck converter of FIG. 9A that are provided by control circuit 102. Power flow through LC circuit 940 may be controlled by changing the switching duty cycle of switching transistors Q1-Q12.

As shown in FIG. 9A, primary switching circuit 930 includes nodes 112, 114, 116, and 118 that are coupled between two switching transistors and link the two switching transistors. Primary switching circuit 930 also includes nodes 110 and 920 that are coupled to one switching transistor. Input voltage source Vin is coupled between node 920 and node 110 where node 110 is coupled to ground 120 and thus voltage source Vin is coupled across five switching transistors Q0-Q4. Node 112 that is coupled between switching transistors Q1 and Q2 is also coupled to a first secondary switching circuit and the first secondary switching circuit is coupled to LC circuit 940. In some embodiments, LC circuit 940 is coupled between node 902 of first secondary switching circuit and ground 120, between node 906 of second secondary switching circuit and ground 120, between node 908 of third secondary switching circuit and ground 120, and between node 910 of fourth secondary switching circuit and ground 120. Switching circuit 955 includes capacitor C1 that is coupled between node 904 and ground 120. Switching circuit 955 further includes first flying capacitor Cfly1 that is coupled between nodes 112 and 902, second flying capacitor Cfly2 that is coupled between nodes 114 and 906, third flying capacitor Cfly3 that is coupled between nodes 116 and 908, and fourth flying capacitor Cfly4 that is coupled between nodes 118 and 910. In some embodiments, switching circuit 955 is coupled between primary switching circuit 930 and LC circuit 940. Switching circuit 955 may include node 902 that is coupled between two switching transistors Q5 and Q6 and links the two switching transistors. Switching circuit 955 may also include node 904 that is coupled to switching transistor Q5. Switching transistor Q6 of switching circuit 955 is coupled between node 902 and ground 120. Additionally, switching circuit 955 may include: i) node 906 that is coupled between two switching transistors Q7 and Q8 and links the two switching transistors, ii) node 908 that is coupled between two switching transistors Q9 and Q10 and links the two switching transistors, and iii) node 910 that is coupled between two switching transistors Q11 and Q12 and links the two switching transistors. In some examples, switching circuit 955 may create a path for discharging the pulses received from primary switching circuit 930 to ground and thus reducing output voltage Vo. An output voltage Vo may be defined as the voltage across capacitor Cs that is coupled between node 108 of LC circuit 940 and ground 120. In some examples, one end of switching transistors Q5, Q7, Q9, and Q11 are all coupled to node 904 of capacitor C1 and thus capacitor C1 is coupled between switching transistors Q5, Q7, Q9, and Q11 and ground 120.

In some embodiments, before switching of the switching transistors Q1-Q12, capacitor C1 that is coupled between node 904 and ground 120 may be pre-charge to ¼*|Vin|, first flying capacitor Cfly1 that is coupled between nodes 112 and 902 may be pre-charge to ¼*|Vin|, second flying capacitor Cfly2 that is coupled between nodes 114 and 906 may be pre-charge to ½*|Vin|, third flying capacitor Cfly3 that is coupled between nodes 116 and 908 may be pre-charge to ¾*|Vin|, and fourth flying capacitor Cfly4 that is coupled between nodes 118 and 910 may be pre-charged to |Vin| via a separate circuit that is controlled by control circuit 102. The pre-charging of capacitors C1, Cfly1, Cfly2, Cfly3, and Cfly4 may reduce high voltage and/or current of switching transistors during a start-up of the converter. Pre-charging of the capacitors is described with respect to FIGS. 10A and 10B. In some embodiments, pre-charging may limit voltage value of switching transistors Q2, Q3, Q4 to ½*|Vin|.

Figure 10A:
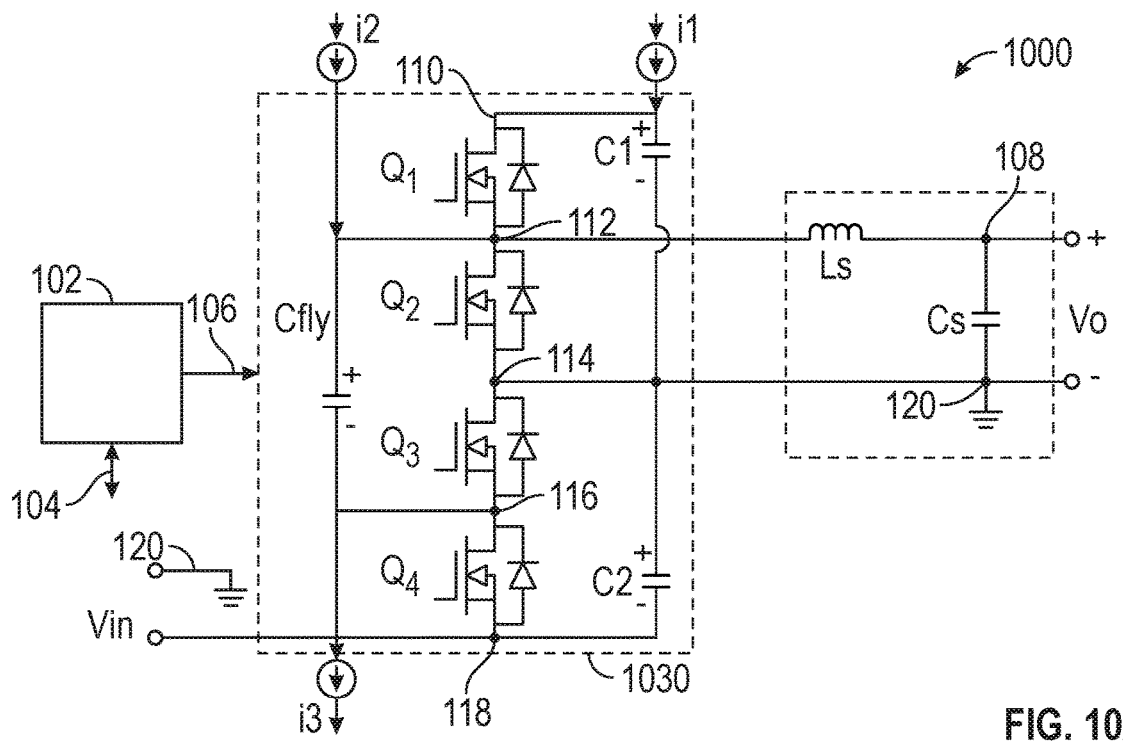
FIGS. 10A and 10B are diagrams of an exemplary hybrid PWM converter with a pre-charging circuit for charging the capacitors.
Figure 10B:
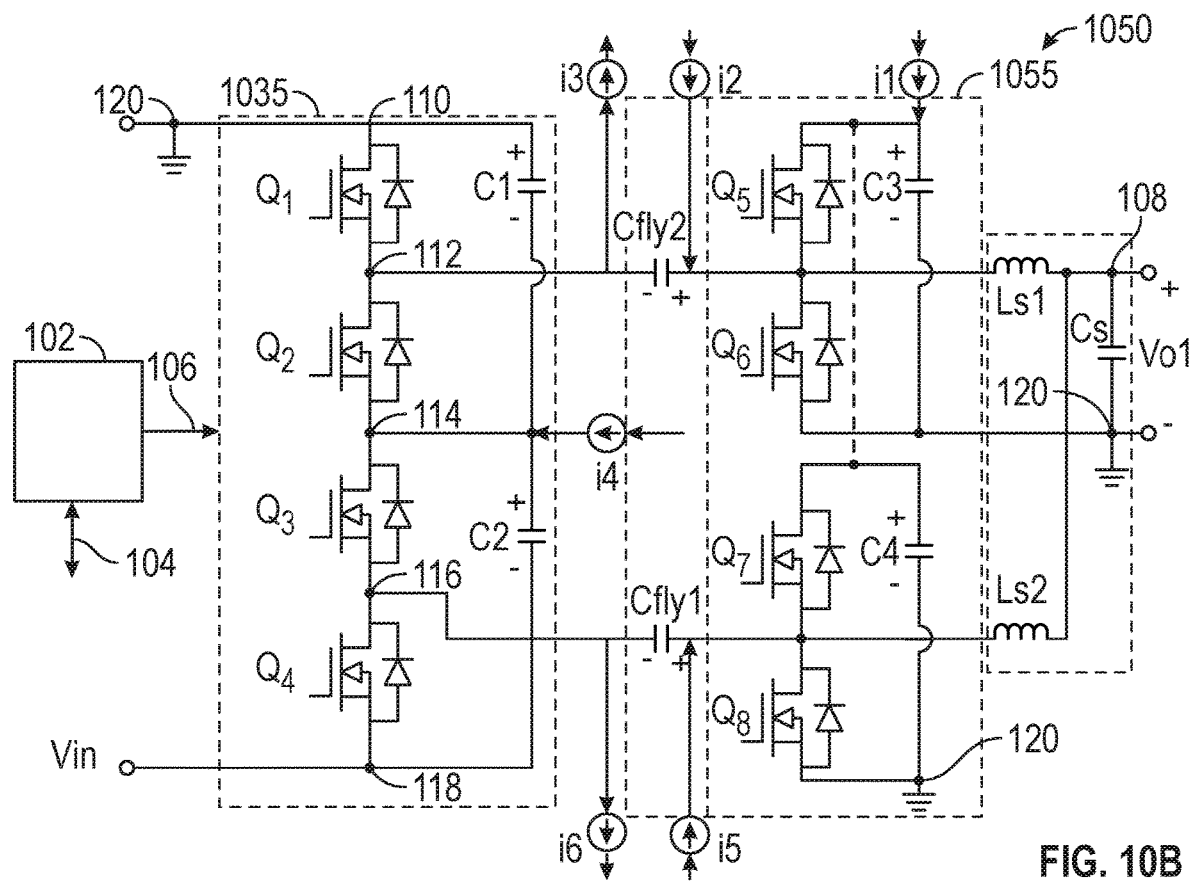

FIGS. 10A and 10B are diagrams of an exemplary hybrid PWM converter with a pre-charging circuit for charging the capacitors. In some embodiments, a pre-charging circuit, e.g., pre-charging circuit of FIG. 10A or 10B is initially applied to hybrid power converters of FIGS. 2A-9A when the switching transistors are turned off to pre-charge the capacitors. After pre-charging the capacitors, hybrid power converters of FIGS. 2A-9A may start switching on or off. FIG. 10A shows primary switching circuit 1030 with three capacitors Cfly, C1, and C2. As s shown in hybrid PWM buck converter 1000 of FIG. 10A, the three capacitors Cfly, C1, and C2 may be charged via current sources i1, i2, and i3 when the switching transistors Q1-Q4 are off. In some embodiments, control circuit 102, in addition to providing the switching signals of the switching transistors may provide control signals to control other switches of the hybrid PWM converter 1000 and to connect or disconnect current sources i1, i2, and i3. In some examples, after hybrid power converters of FIGS. 2A-9A start switching on or off a switching duty cycle of the switching transistors may be increased to increase an output voltage of the hybrid power converter to a predefined value. In some examples, the duty cycle of the switching transistors may be increased according to a predefined pattern, e.g., a gradual increase pattern.

FIG. 10B shows primary switching circuit 1035 with two capacitors C1, and C2 and switching circuit 1055 having two secondary switching circuits and four capacitors Cfly1, Cfly2, C3, and C4. As shown in hybrid PWM buck converter 1050 of FIG. 10B, the six capacitors Cfly1, Cfly2, C1, C2, C3, and C4 may be charged via current sources i1, i2, i3, i4, i5, and i6 when the switching transistors Q1-Q8 are off. In some embodiments, control circuit 102, in addition to providing the switching signals of the switching transistors Q1-Q8 may provide control signals to control other switches of the hybrid PWM converter 1050 and to connect or disconnect current sources i1, i2, i3, i4, i5, and i6.

Figure 11:
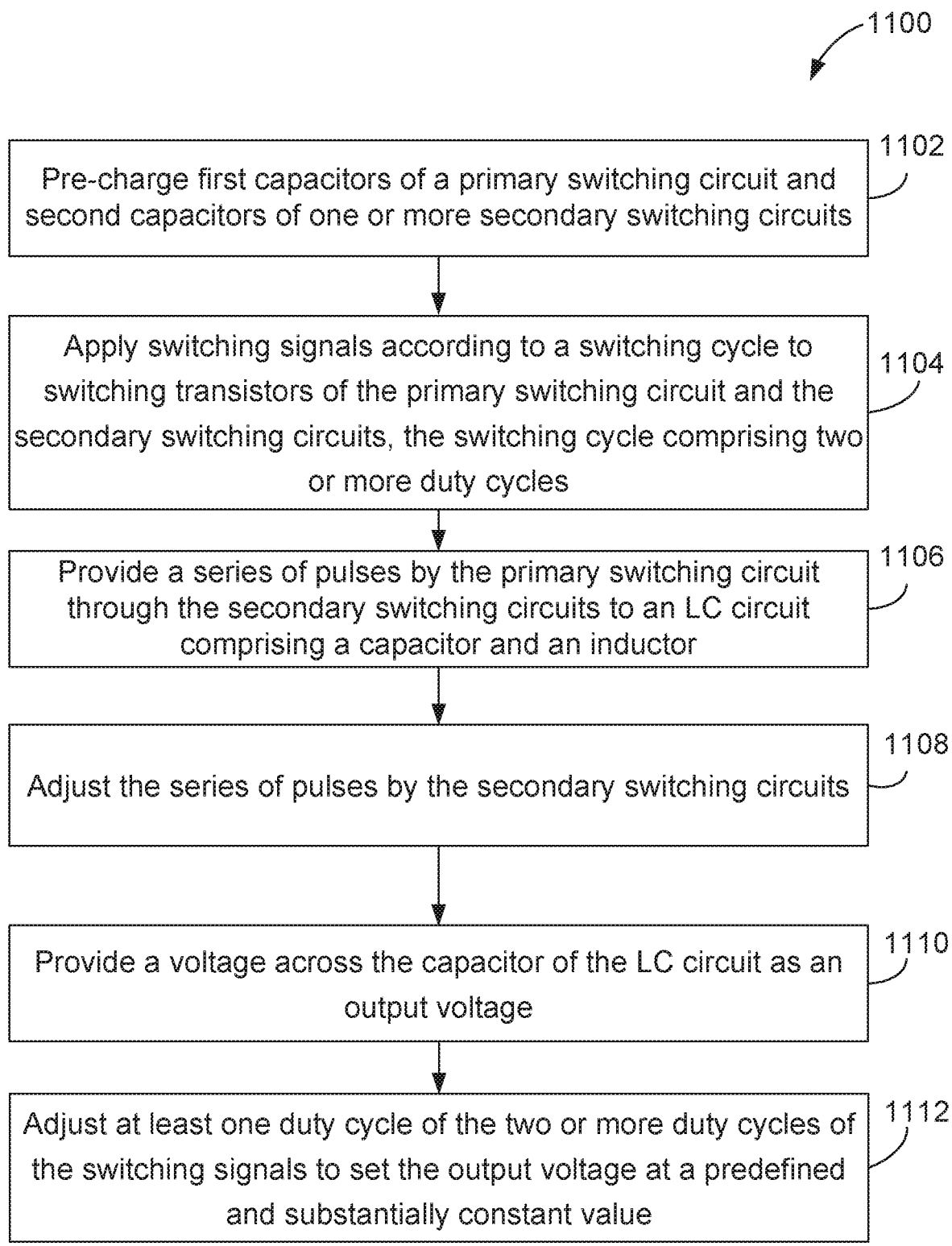
FIG. 11 is a flowchart of an exemplary process for providing a reverse polarity output voltage in a hybrid inverting PWM power converter circuit.

FIG. 11 is a flowchart of an exemplary process for providing a reverse polarity output voltage in a hybrid inverting PWM power converter circuit, according to some implementations described herein. For explanatory purposes, the various blocks of exemplary process 1100 are described herein with reference to FIGS. 2A-4A and FIGS. 6A-9A, and the components and/or processes described herein. The one or more of the blocks of process 1100 may be implemented, for example, by any of the various power converter circuits described herein. In some implementations, one or more of the blocks may be implemented apart from other blocks, and by one or more different processors or devices. Further for explanatory purposes, the blocks of exemplary process 1100 are described as occurring in serial, or linearly. However, multiple blocks of exemplary process 1100 may occur in parallel. In addition, the blocks of exemplary process 1100 need not be performed in the order shown and/or one or more of the blocks of exemplary process 1100 need not be performed.

The process 1100 begins at step 1102; first capacitors of a primary switching circuit and second capacitors of one or more secondary switching circuits are pre-charged. The pre-charging may be performed by connecting a pre-charging circuit that includes one or more current sources to the capacitors of the primary switching circuit and to the capacitors of the one or more secondary switching circuits. Pre-charging is described with respect to FIGS. 10A and 10B. In some embodiments, during pre-charging the switching transistors of the primary switching circuit and the secondary switching circuits are turned off. In some embodiments, control circuit 102 may turn off the switching transistors of primary switching circuits 230, 330, 430, 530, 630, 730, 830, and 930 of FIGS. 2A-9A during pre-charging. In some embodiments, control circuit 102 may connect the pre-charging circuit to the capacitors, e.g., capacitors Cfly, C1, and C2 of the primary switching circuits to pre charge the capacitors. After pre-charging, the control circuit may disconnect the pre-charging circuit and may start switching the switching transistors of the primary switching circuits 230, 330, 430, 530, 630, 730, 830, and 930. In some embodiments, control circuit 102 may turn off the switching transistors of switching circuits 655, 755, 855, and 955 of FIGS. 6A-9A during pre-charging. In some embodiments, control circuit 102 may connect the pre-charging circuit to the capacitors of the secondary switching circuits to pre-charge the capacitors, e.g., to pre-charge capacitors Cfly2 and C3 of switching circuit 655. After pre-charging, the control circuit may disconnect the pre-charging circuit and may start switching the switching transistors of switching circuits 655, 755, 855, and 955. In some examples, an input voltage source Vin is coupled the primary switching circuits and the one or more capacitors of the primary and secondary switching circuits are pre-charged to a fraction of |Vin| or may be pre-charged to |Vin|. In some embodiments, the pre-charging prevents high voltage values across the switching transistors of the primary and secondary switching circuits at an initial stage of starting a hybrid power converter.

In step 1104, switching signals are applied according to a switching cycle to switching transistors of the primary switching circuit and the secondary switching circuits. In some examples as shown in FIG. 7A, the switching signals may be applied to four switching transistors Q1-Q4 of primary switching circuit 730 and to four switching transistors Q5-Q8 of two secondary switching circuits of switching circuit 755. A primary switching circuit may include three or more switching transistors that are connected in series and a secondary switching circuit may include two or more switching transistors. The primary and secondary switching circuits are shown in FIG. 2A-9A. Primary switching circuits 230, 330, 430, 530, 630, and 730 include four switching transistors Q1-Q4 that are connected in series. The switching signals are shown as switching signals 290, 390, 490, 590, 690, 790, 890, and 990 in FIGS. 2B-9B. The switching signals in FIGS. 2B-6B turn the switching transistors Q1 and Q3 on for a duration of Ton and turn the switching transistors Q1 and Q3 off for a duration of Toff. In some embodiments, the switching cycle comprises two or more switching signals where each one of the switching signals may have a different duty cycle such that two duty cycles can be inverse of each other. In some examples, different switching transistors are switched on or off in phase opposition, e.g., complementary to each other. In some examples, by applying switching signals 250 of FIG. 2B, switching transistors Q1 and Q3 are turned on and switching transistors Q2 and Q4 are turned off and vice versa. In some embodiments, after pre-charging, the switching signals are applied to the switching transistors of the primary switching circuits and secondary switching circuits to turn the switching transistors on or off. In some examples, the switching signals include three duty cycles where a first and second duty cycle are inverse of each other and a third duty cycle is different from the first and second duty cycles. In some examples, as shown in FIGS. 7B-9B, the third duty cycle may be the same as one of the first or second duty cycles but the switching signals produced by the third duty cycle may have phase shift with respect to the switching signals produced by first and second duty cycles.

In step 1106, a series of pulses is provided by the primary switching circuit through the secondary switching circuits to an LC circuit that includes a capacitor and an inductor. In some examples, the series of pulses is a voltage that is provided by the primary switching circuit to the LC circuit to generate an inductor current in the inductor and to generate a voltage across the capacitor of the LC circuit. As shown in FIGS. 6A-9A, the series of pulses are provided by primary switching circuits 630, 730, 830, and 930 through one, two, three, or four secondary switching circuits of respective switching circuits 655, 755, 855, and 955 to the LC circuit. In some embodiments as shown in FIGS. 2A-4A, the series of pulses are directly provided through an input port of the LC circuit that is coupled across a switching transistor of the primary switching circuit.

In step 1108, the series of pulses are adjusted by the secondary switching circuits. As shown in FIGS. 6A-9A, the series of pulses that are provided by primary switching circuits 630, 730, 830, and 930 are adjusted, e.g., modified, by one, two, three, or four secondary switching circuits of respective switching circuits 655, 755, 855, and 955 before reaching the LC circuit. In some examples as shown in FIG. 6A, a voltage between node 112 and ground 120 is applied via secondary switching circuit 655 to LC circuit 640. In some examples as shown in FIG. 7A, voltages between node 112 and ground 120 and between node 116 and ground 120 are applied via switching circuits 755 that includes two secondary switching circuits to LC circuit 740. In some examples, the LC circuit 740 includes two inductors Ls1 and Ls2 that each are coupled between one of the secondary switching circuits and the capacitor Cs of the LC circuit 740.

In step 1110, a voltage across the capacitor of the LC circuit is provided as an output voltage. In some examples, as shown in FIGS. 2A-4A and FIGS. 6A-9A, the voltage across capacitor Cs between node 108 and ground 120 is provided as the output voltage. The output voltage may have a reverse polarity with respect to an input voltage Vin that may be coupled to the primary switching circuit as shown in FIGS. 2A-4A and FIGS. 6A-9A.

In step 1112, at least one duty cycle of the two or more duty cycles of the switching signals are adjusted. The duty cycles may be adjusted to set an output voltage at a predefined value, e.g., predetermined value. The duty cycles may be constantly adjusted to keep the output voltage within an predefined range of the predetermined output voltage value, e.g., within 10 percent. In some examples, at least one duty cycle may be gradually increased to increase the output voltage to the predetermined value.

Figure 12:
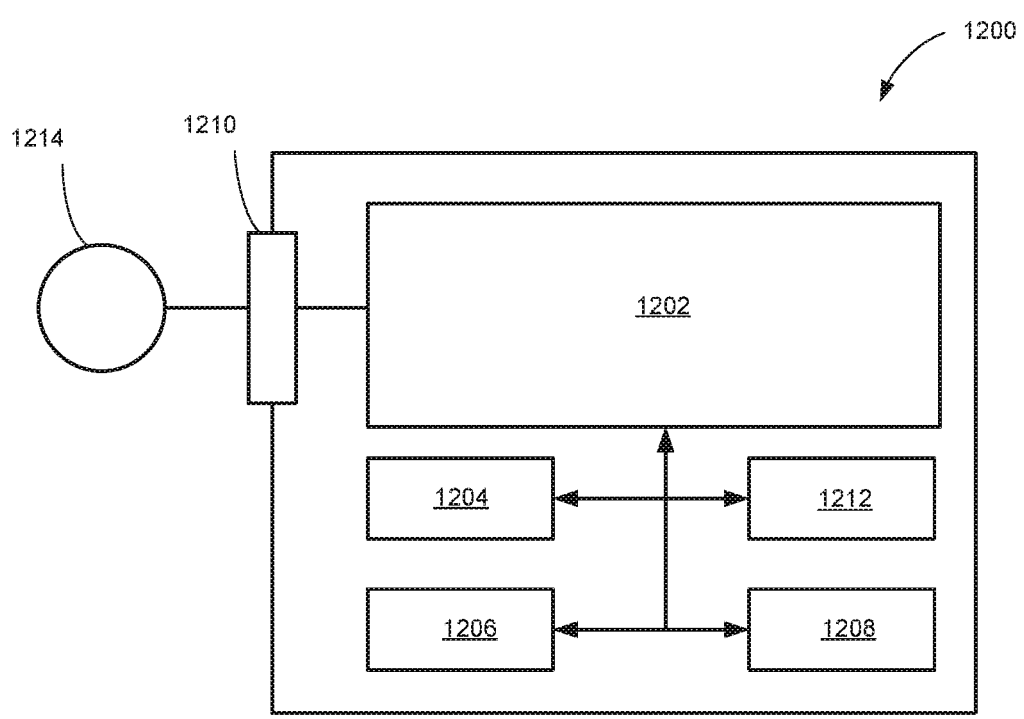
FIG. 12 is a diagram of an exemplary electronic system 1200 that implements an inverting PWM power converter.

FIG. 12 is a diagram of an exemplary electronic system 1200 that implements an inverting PWM power converter, according to various implementations described herein. Electronic system 1200, in combination with the disclosure regarding FIGS. 2A-4A and FIGS. 6A-9A, may be any electronic device utilizing power from a power source. For example, electronic system 1200 may be representative of a computing device (e.g., a personal computer or a mobile device such as a smartphone, tablet computer, laptop, PDA, a wearable such as a watch or band, or combination thereof), or a consumer appliance, television or other display device, radio or telephone, home audio system, or the like.

In some implementations, electronic system may include a power delivery device 1202 (e.g., a power supply) and a load. The load may include various components of electronic system 1200, including one or more of a central processing unit (CPU) 1204, various memory systems 1206, one or more input and/or output (I/O) devices 1208, a power interface 1210, and one or more batteries 1212. The CPU 1204 may be a multi-core processor, a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing.

A memory system 1206 may include, for example, volatile memory used to temporarily store data and information used to manage electronic system 1200, a random access memory (RAM), and/or non-volatile memory such as a magnetic disk, flash memory, peripheral SSD, and the like. I/O device 1208 may include an input device such as a keyboard, a touch screen, a touch pad, voice control system, or other device for input of data. I/O device 1208 may include an output device such as a display device, audio device (e.g., a speaker), or data interface (e.g., a host data bus) for output of data. In some implementations, one or more elements of electronic system 1200 can be integrated into a single chip. In some implementations, the elements can be implemented on two or more discrete components.

Power delivery device 1202 may include any of the previously described power converter circuits (including an auxiliary bypass circuit), including a corresponding control circuit. Accordingly, power delivery device 1202 may be configured (e.g., as a step up or step down converter) to convert a first voltage to a second voltage, different than the first voltage. Power delivery device 1202 may receive an input power (e.g., at a voltage Vin) from an external power source 1214 via power interface 1210. The input power may be a DC power. In some implementations, the input power may be an alternating current source that is converted to DC (e.g., by power interface 1210) before being utilized by power delivery device 1202. Additionally or in the alternative, the input power may be DC from battery 1212.

Power delivery device 1202 may produce a voltage according to the load requirements of various components of electronic system 1200. In this regard, power delivery device 1202 may implement multiple different types of converter circuits to accommodate different load requirements of the various components of electronic system 1200. Additionally or in the alternative, power delivery device 1202 may be configured to provide charge to battery 1212 (e.g., as part of a battery charger system) based on power from external power source 1214.

It is understood that illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the present disclosure.

It is understood that the specific order or hierarchy of steps in the processes disclosed is presented as an illustration of some exemplary approaches. Based upon design preferences and/or other considerations, it is understood that the specific order or hierarchy of steps in the processes may be rearranged. For example, in some implementations some of the steps may be performed simultaneously. Thus the accompanying method claims present elements of the various steps in a sample order, and are not meant to be limited to the specific order or hierarchy presented.

The previous description is provided to enable any person skilled in the art to practice the various aspects described herein. The previous description provides various examples of the present disclosure, and the present disclosure is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a circuit or processor configured to monitor and control an operation or a component may also mean the circuit or processor being programmed to monitor and control the operation or being operable to monitor and control the operation. Likewise, a circuit or processor configured to execute code may be construed as a circuit or processor programmed to execute code or operable to execute code.

The terms "start-up" and "power-up" are intended to include, but not be limited to, the plain meaning of each respective term, and for the purposes of this disclosure may be used interchangeably. The terms "start-up" and "power-up" may include, for example, a point in time at which a circuit is turned on (e.g., started) and/or a period of time shortly thereafter.

A phrase such as an "aspect" does not imply that such aspect is essential to the present disclosure or that such aspect applies to all configurations of the present disclosure. A disclosure relating to an aspect may apply to all configurations, or one or more configurations. An aspect may provide one or more examples. A phrase such as an aspect may refer to one or more aspects and vice versa. A phrase such as an "implementation" does not imply that such implementation is essential to the present disclosure or that such implementation applies to all configurations of the present disclosure. A disclosure relating to an implementation may apply to all aspects, or one or more aspects. An implementation may provide one or more examples. A phrase such as an "implementation" may refer to one or more implementations and vice versa. A phrase such as a "configuration" does not imply that such configuration is essential to the present disclosure or that such configuration applies to all configurations of the present disclosure. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example, instance, or illustration." Any aspect described herein as "exemplary" is not necessarily to be construed as preferred or advantageous over other aspects. In addition, description of a feature, advantage or mode of operation in relation to an example combination of aspects does not require that all practices according to the combination include the discussed feature, advantage or mode of operation.

As used herein, the singular forms "a", "an" and "the" are intended to include the plural forms as well, unless the context clearly indicates otherwise. Numeric terms such as "first", "second", "third," etc., unless specifically stated, are not used herein to imply a particular ordering of the recited structures, components, capabilities, modes, steps, operations, or combinations thereof with which they are used.

The terms "comprise," "comprising," "includes," and "including", as used herein, specify the presence of one or more recited structures, components, capabilities, modes, steps, operations, or combinations thereof, but do not preclude the presence or addition of one or more other structures, components, capabilities, modes, steps, operations, or combinations thereof.

What is claimed is:

1. A hybrid power converter, comprising
a primary switching circuit comprising:
three or more switching transistors connected in series and having a first end and a second end, each of the three or more switching transistors linked to an adjacent transistor of the three or more switching transistors by a respective node of a first plurality of nodes including a first node, a second node, and a third node;
one or more capacitors including a first capacitor, wherein the first capacitor is coupled to the second node, and wherein the first capacitor is coupled across two of the three or more switching transistors that are connected in series; and
a first flying capacitor coupled to at least one of the first node and the third node of the first plurality of nodes;
an LC circuit comprising a third capacitor and an inductor connected in series, wherein the LC circuit is coupled to the primary switching circuit via a first secondary switching circuit, wherein the LC circuit is configured to receive a first voltage of the primary switching circuit via the first secondary switching circuit and to generate an output voltage across the third capacitor, wherein the output voltage has a reverse polarity with respect to an input voltage that is coupled to the primary switching circuit; and
a control circuit coupled to the primary switching circuit and configured to generate a switching signal that is applied to the three or more switching transistors to switch the three or more switching transistors on or off according to a switching cycle configured to provide one or more duty cycles for the switching transistors, wherein the primary switching circuit is configured to provide the first voltage as a first series of pulses based on the switching cycle to the LC circuit and modification of the one or more duty cycles adjusts an amplitude of the output voltage to cause the LC circuit to provide an essentially constant output voltage.

2. The hybrid power converter of claim 1, wherein the first capacitor is coupled either between:
the second node and the first end of the three or more switching transistors; or
the second node and the second end of the three or more switching transistors.

3. The hybrid power converter of claim 1, wherein an input voltage is coupled between a ground and the second end, and the output voltage of the hybrid power converter is provided across the third capacitor of the LC circuit, and wherein the first flying capacitor is also coupled between the first node and the third node of the first plurality of nodes.

4. The hybrid power converter of claim 1, wherein the third capacitor is coupled from one end to a ground.

5. The hybrid power converter of claim 1, wherein the three or more switching transistors includes four switching transistors, wherein the one or more capacitors include a second capacitor, wherein the first capacitor is coupled between the second node and the first end of the four switching transistors, and wherein the second capacitor is coupled between the second node and the second end of the four switching transistors.

6. The hybrid power converter of claim 1, wherein the one or more duty cycles comprise at least two duty cycles that are complementary to each other.

7. The hybrid power converter of claim 1, wherein the first secondary switching circuit is coupled via the first node of the primary switching circuit between the primary switching circuit and the LC circuit, and the first secondary switching circuit is configured to create a first path for the first series of pulses received from the primary switching circuit to the LC circuit, the first secondary switching circuit comprising:
a first set of two switching transistors connected via a fourth node;
a second flying capacitor that is coupled between the fourth node and a node of the first plurality of nodes; and
a fourth capacitor is coupled between a switching transistor of the first set of two switching transistors and the ground, wherein the control circuit is coupled to the first secondary switching circuit to provide the switching signal to the first set of two switching transistors to switch the first set of two switching transistors on or off according to the switching cycle.

8. The hybrid power converter of claim 7, further comprising:
a second secondary switching circuit coupled between the primary switching circuit and the LC circuit, the second secondary switching circuit is configured to create a second path for a second series of pulses received from the primary switching circuit to the LC circuit, the second secondary switching circuit comprising:
a second set of two switching transistors connected via a fifth node;
the first flying capacitor is coupled between the fifth node and a node of the first plurality of nodes; and
a fifth capacitor is coupled between a switching transistor of the second set of two switching transistors and the ground,
wherein the control circuit is coupled to the second secondary switching circuit to provide the switching signal to the second set of two switching transistors to switch the second set of two switching transistors on or off according to the switching cycle.

9. The hybrid power converter of claim 8, wherein the inductor comprises a first inductor and a second inductor, wherein the first inductor is coupled between the fourth node and the third capacitor of the LC circuit and the second inductor is coupled between the fifth node and the third capacitor of the LC circuit.

10. The hybrid power converter of claim 8, wherein the fourth and the fifth capacitors are in parallel.

11. The hybrid power converter of claim 8, further comprising:
third and fourth secondary switching circuits coupled between the primary switching circuit and the LC circuit, the third and fourth secondary switching circuits are configured to create third and fourth paths for a third and fourth series of pulses received from the primary switching circuit to the LC circuit, the third and fourth secondary switching circuits comprising:
a third set of two switching transistors connected via a sixth node;
a third flying capacitor is coupled between the sixth node and a node of the first plurality of nodes; and
a sixth capacitor is coupled between a switching transistor of the third set of two switching transistors and the ground;
a fourth set of two switching transistors connected via a seventh node;
a fourth flying capacitor is coupled between the seventh node and a node of the first plurality of nodes; and
a seventh capacitor is coupled between a switching transistor of the fourth set of two switching transistors and the ground,
wherein the control circuit is coupled to the third and fourth secondary switching circuits to provide the switching signal to the third and fourth sets of two switching transistors to switch the third and fourth sets of two switching transistors on or off according to the switching cycle.

12. The hybrid power converter of claim 11, wherein the three or more switching transistors includes five switching transistors, wherein the first flying capacitor, the second flying capacitor, the third flying capacitor, and the fourth flying capacitor are coupled to separate nodes of the first plurality of nodes.

13. The hybrid power converter of claim 11, wherein the inductor comprises a first inductor, a second inductor, a third inductor, and a fourth inductor, wherein the first inductor is coupled between the fourth node and the third capacitor of the LC circuit, the second inductor is coupled between the fifth node and the third capacitor, the third inductor is coupled between the sixth node and the third capacitor, and the fourth inductor is coupled between the seventh ninth node and the third capacitor.

14. The hybrid power converter of claim 11, further comprising:
a pre-charging circuit coupled to the primary switching circuit, coupled to one or more secondary switching circuits, and coupled to the control circuit,
wherein the control circuit is configured to couple the pre-charging circuit to the primary switching circuit to pre-charge the first and second capacitors and the first flying capacitor of the primary switching circuit, and wherein the control circuit is configured to couple the pre-charging circuit to the one or more secondary switching circuits to pre-charge one or more respective capacitors of the one or more secondary switching circuits, and wherein the control circuit is configured to turn off the three or more switching transistors of the primary switching circuit and a respective set of two switching transistors of the one or more secondary switching circuits during pre-charging and to start switching the three or more switching transistors of the primary switching circuit and the respective set of two switching transistors of the one or more secondary switching circuits on or off after pre-charging.

15. A hybrid power converter, comprising:
an LC circuit comprising a capacitor and an inductor connected in series;
a primary switching circuit comprising three or more switching transistors connected in series;
at least one secondary switching circuit coupled to a node linking two adjacent switching transistors of the three or more switching transistors of the primary switching circuit and to the LC circuit and configured to provide a first voltage to the LC circuit; and
a control circuit coupled to the primary switching circuit and the at least one secondary switching circuit and configured to generate a switching signal that is applied to the three or more switching transistors and the at least one secondary switching circuit to switch the three or more switching transistors and switching transistors of the at least one secondary switching circuit on or off according to a switching cycle configured to provide one or more duty cycles for the switching transistors,
wherein modifying the one or more duty cycles modifies an amplitude of the first voltage, and wherein the LC circuit is coupled across a switching transistor of the at least one secondary switching circuit and is configured to receive the first voltage from the at least one secondary switching circuit and to generate, based on the first voltage, an essentially constant output voltage across the capacitor, the output voltage having a reverse polarity with respect to an input voltage that is coupled to the primary switching circuit.

16. The hybrid power converter of claim 15, wherein the at least one secondary switching circuit comprises two or more secondary switching transistors that are coupled between the primary switching circuit and the LC circuit.

17. A method of operating a hybrid power converter, comprising:
   pre-charging one or more first capacitors of a primary switching circuit and one or more second capacitors of one or more secondary switching circuits to predefined respective voltages;
   after pre-charging, applying the switching signal according to a switching cycle to three or more switching transistors of the primary switching circuit and to one or more switching transistors of the one or more secondary switching circuits to turn the three or more switching transistors of the primary switching circuit and the one or more switching transistors of the one or more secondary switching circuits on or off, the switching cycle comprising two or more duty cycles for the switching signal;
   providing a series of pulses by the primary switching circuit based on the two or more duty cycles of the switching signal and through the one or more secondary switching circuits to an LC circuit comprising a capacitor and an inductor connected in series;
   adjusting at least one duty cycle of the two or more duty cycles of the switching signal to adjust the series of pulses to set an output voltage across the capacitor of the LC circuit at a predefined and essentially constant amplitude; and
   providing the output voltage across the capacitor of the LC circuit as an output voltage of the hybrid power converter, wherein the output voltage has a reverse polarity with respect to an input voltage that is coupled to the primary switching circuit.

18. A hybrid power converter, comprising:
   means for applying a switching signal to a primary switching circuit and a secondary switching circuit according to a duty cycle for the switching signal;
   means for applying an input voltage to the primary switching circuit;
   means for providing a series of pulses to an LC circuit from the primary switching circuit based on the duty cycle of the switching signal; and
   means for adjusting the series of pulses via the secondary switching circuit by adjusting the duty cycle of the series of pulses to set an output voltage across the LC circuit at a predefined and essentially constant output value, wherein the output voltage has a reverse polarity with respect to the input voltage.

* * * * *